(12) United States Patent
Saito et al.

(10) Patent No.: US 6,229,569 B1
(45) Date of Patent: May 8, 2001

(54) ELECTRONIC CAMERA

(75) Inventors: Masashi Saito, Hachioji; Kenji Matsumoto, Tokyo, both of (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/021,812

(22) Filed: Feb. 11, 1998

(30) Foreign Application Priority Data

Feb. 13, 1997 (JP) .................................................. 9-028937

(51) Int. Cl.[7] .......................... H04N 5/225; H04N 5/238
(52) U.S. Cl. ......................... 348/362; 348/270; 348/360; 348/368; 348/375; 396/241; 396/275; 396/422
(58) Field of Search .................................. 348/207, 222, 348/224, 262, 265, 266, 268, 269, 270, 272, 273, 280, 360, 361, 362, 367, 368, 373–376, 552; 396/213, 241, 268, 274, 275, 276, 419, 422, 424; 358/906, 909.1; H04N 5/238, 5/225

(56) References Cited

U.S. PATENT DOCUMENTS

| | | | |
|---|---|---|---|
| 2,809,232 | * 10/1957 | Hoyt | 348/360 |
| 3,377,427 | * 4/1968 | Fischer | 348/360 |
| 4,758,905 | * 7/1988 | Okada | 348/368 |
| 4,918,470 | * 4/1990 | Whiteside | 396/275 |
| 4,972,269 | * 11/1990 | Fukushima | 348/368 |
| 5,081,535 | * 1/1992 | Kondo | 348/368 |
| 5,592,221 | * 1/1997 | Mielke | 396/275 |
| 5,740,480 | * 4/1998 | Kuhn | 358/906 |
| 5,933,191 | * 8/1999 | Ariga | 348/375 |

* cited by examiner

*Primary Examiner*—Wendy R. Garber
*Assistant Examiner*—Ngoc-Yen Vu
(74) *Attorney, Agent, or Firm*—Finnegan, Henderson, Farabow, Garrett, & Dunner, L.L.P.

(57) ABSTRACT

An electronic camera comprises a casing in which a photographing section is accommodated; a rotating member mounted rotably to the casing; a plurality of light amount regulating members for regulating a light amount incident to the photographing section; a cover for covering the photographing section; and a rotating member mounted rotably to the casing; wherein the plurality of light amount regulating members and the cover are attached to the rotating member so that each of the plurality of light amount regulating members and the cover member is located at the front of the photographing section in the photographing direction by rotating the rotating member.

8 Claims, 12 Drawing Sheets

ELECTRONIC CAMERA

BACKGROUND OF THE INVENTION

The present invention relates to an electronic camera.

There has been proposed recently a picturephone employing a personal computer and an electronic camera. In this picturephone, a personal computer is connected to a network, and images including an operator and others image-picked up by an electronic camera are inputted in the personal computer to be exchanged each other through the network. However, it is necessary for images picked up to be exchanged through the network to be utilized like a picturephone, a personal computer and an electronic camera need to come into wide use.

However, an electronic camera available on the market has problems that it is expensive and large in size to come into wide use. One of the causes of the problems is that the number of parts is large.

From that viewpoint, it is considered to stop using a cover which interrupts light in the image pickup direction of an image pickup section of an electronic camera, because an image pickup section wherein image pickup is prohibited electrically is common in the case of an electronic camera. However, when the image pickup section of an electronic camera is left to be seen by a person of image pickup, an operator feels uneasy because he or she can not be sure that he or she is not photographed when he or she does not want to be photographed, which is a problem.

One of the causes making an electronic camera available on the market to be high in cost and large in size is that there is provided a variable iris for adjusting continuously an amount of adjustment of a quantity of light. Therefore, it is considered not to provide a variable iris for adjusting an amount of adjustment of a quantity of light, as in the case of a single use camera on the market. However, it is not possible to obtain appropriate images without providing at all a member for adjusting a quantity of light which is for adjustment of a quantity of light in the image pickup direction of an image pickup section, because an exposure latitude of the image pickup section of an electronic camera is usually narrower than that of a silver halide color negative film.

An object of the invention is to provide a small-sized and low cost electronic camera wherein light-shielding for the front portion of an image pickup section in the image pickup direction can be conducted easily by a cover, and a section to adjust a quantity of light can be positioned easily at the front portion of an image pickup section in the image pickup direction.

An exposure latitude of the image pickup section of an electronic camera is usually narrower than that of a silver halide color negative film, and it is therefore preferable that an amount of adjustment of a quantity of light can be adjusted.

SUMMARY OF THE INVENTION

Another object of the invention is to provide a small-sized and low cost electronic camera wherein an amount of adjustment of a quantity of light can simply be adjusted.

Means for Solving Problems

Objects of the invention can be attained by all items which are necessary to specify the inventions described in the following items. Each item will be explained as follows, and then common items will be explained thereafter.

Explanation of Item 1

"An electronic camera comprising an image pickup section which photographs a subject, a main body which houses the image pickup section, a rotating member provided rotatably on the main body, a cover, and a light quantity adjusting member having a light quantity adjusting section, wherein when the rotating member is rotated, the cover and the light quantity adjusting member move, interlocking with the rotation of the rotating member, and thereby both of the cover and the light quantity adjusting section can be positioned at the front portion of the image pickup portion in the image pickup section, the cover, when positioned at the front portion of the image pickup section in the image pickup direction, shields the front portion of the image pickup section in the image pickup direction against light, and the light quantity adjusting section, when positioned at the front portion of the image pickup section in the image pickup direction, adjusts a quantity of incident light entering the image pickup section" makes one rotating member to simply close the front portion of the image pickup section in the image pickup direction for light-shielding when no photographing is conducted, and to simply position the light quantity adjusting section at the front portion of the image pickup section in the image pickup direction and to adjust a quantity of incident light entering the image pickup section when photographing is conducted, which makes the electronic camera to be small in size and low in cost.

Incidentally, light-shielding conducted by the cover is intended not give impression that an operator is being photographed to the operator when the cover is positioned at the front portion of the image pickup section in the image pickup direction, and if the cover is shielded against visible light, it does not matter whether infrared rays and ultraviolet rays are interrupted or not interrupted.

In addition to the light quantity adjusting section of and the cover, objects which do not change a quantity of incident light entering an image pickup section at all such as a large hole provided on the light quantity adjusting section having neither effect for a filter nor effect for an iris, and a portion having thereon nothing (hereinafter referred to as a blank portion) can also be arranged to be positioned at the front portion of the image pickup section in the image pickup direction. Due to this, it is possible to simply adjust an amount of adjustment of a quantity of light because the blank portion and the light quantity adjusting section are different each other in terms of an amount of adjustment of a quantity of light by an amount by which a quantity of light is not reduced by the blank portion. Therefore, one rotating member can simply close and shield the front portion of the image pickup section in the image pickup direction against light when no photographing is conducted, and it can simply adjust an amount of adjustment of a quantity of light when photographing is conducted, which makes the electronic camera to be small in size and low in cost.

Explanation of Item 2

"The electronic camera according to Item 1, wherein the light quantity adjusting member has plural light quantity adjusting sections each differing from others in terms of an amount of adjustment of a quantity of light, and all of the plural light quantity adjusting sections can be positioned at the front portion of the image pickup section in the image pickup direction when the rotating member is rotated" makes it possible to adjust an amount of adjustment of a quantity of light simply, because all of the plural light quantity adjusting sections each differing from others in terms of an amount of adjustment of a quantity of light can be positioned at the front portion of the image pickup section in the image pickup direction when the rotating member is rotated. Therefore, one rotating member can simply close and shield the front portion of the image pickup section in the image pickup direction against light when no photographing is conducted, and it can simply adjust an amount of adjustment of a quantity of light when photographing is conducted, which makes the electronic camera to be small in size and low in cost.

Explanation of Item 3

"The electronic camera according to Item 1 or Item 2, wherein the cover and the rotating member are united solidly" makes it possible, due to its structure that the cover and the rotating member are united solidly, to reduce the number of constitutional parts, and to realize simply and inexpensively excellent positional accuracy between the cover and the rotating member and sure light-shielding by means of the cover when photographing is not conducted.

Explanation of Item 4

"The electronic camera according to either one of Items 1–3, wherein the light quantity adjusting member and the rotating member are united solidly" makes it possible, due to its structure that the light quantity adjusting member and the rotating member are united solidly, to reduce the number of constitutional parts, and to realize simply and inexpensively excellent positional accuracy between the light quantity adjusting member and the rotating member and sure achieving an original amount of light quantity adjustment for the light quantity adjusting section when photographing is conducted.

Explanation of Item 5

"The electronic camera according to either one of Items 1–4, wherein the rotating member is a disk-shaped dial whose center represents a center of rotation" makes an operation easy when a dial is rotated manually, and makes the rotation easy when the dial is rotated automatically, and makes the rotating member to be hardly deformed when it is rotated.

Further, it is possible to arrange the cover and the light quantity adjusting section easily so that either of the cover and the light quantity adjusting section may be positioned at the front portion of an image pickup section in the image pickup direction for each rotation of a dial for the same angle. Due to this arrangement, an operator of an electronic camera can position either the cover or the light quantity adjusting section at the front portion of an image pickup section in the image pickup direction in a natural feeling, and it is possible to simply conduct mechanical control which positions either of light quantity adjusting sections at the front portion of an image pickup section in the image pickup direction by rotating a dial in the case where the dial is rotated mechanically.

Explanation of Item 6

"The electronic camera according to Item 5, wherein the light quantity adjusting member and the dial are provided along the circumference of the dial to be united solidly, and the cover and the light quantity adjusting section are arranged in the direction of circumference of the dial to line up in a single file" makes it possible, due to its structure that the cover and the light quantity adjusting member are united with the dial solidly, to make the electronic camera to be small in size and low in cost further, and to realize simply and inexpensively the excellent positional accuracy among the cover, the light quantity adjusting member and the dial, and to realize the sure light-shielding of the front portion of the image pickup section in the image pickup direction by means of the cover when photographing is not conducted, and the sure achieving of an original amount of light quantity adjustment for the light quantity adjusting section when photographing is conducted, because the cover and the light quantity adjusting section both viewed from the rotational center of the dial are not overlapped in terms of their angular positions due to the structure that the cover and the light quantity adjusting section are arranged in the direction of circumference of the dial to line up in a single file.

Further, it is possible to arrange the cover and the light quantity adjusting section easily so that either of the cover and the light quantity adjusting section may be positioned at the front portion of an image pickup section in the image pickup direction for each rotation of a dial for the same angle. Due to this arrangement, an operator of an electronic camera can position either the cover or the light quantity adjusting section at the front portion of an image pickup section in the image pickup direction in a natural feeling, and it is possible to simply conduct mechanical control which positions either the cover or the light quantity adjusting section at the front portion of an image pickup section in the image pickup direction by rotating a dial in the case where the dial is rotated mechanically in place of manually.

"The electronic camera according to either one of Items 1–6, wherein there is provided an image focusing section which is provided at the front portion of the image pickup section in the image pickup direction and focuses an image of a subject on the image pickup section, and both of the cover and the light quantity adjusting section can be positioned at the front portion of the image focusing section in the image pickup direction by rotating the rotating member, and the light quantity adjusting section, when it is positioned at the front portion of the image pickup section in the image pickup direction, adjusts a quantity of incident light entering the image pickup section, due to a filter provided" makes it easy technically for the light quantity adjusting section to adjust, when it is positioned at the front portion of the image pickup section in the image pickup direction, a quantity of incident light entering the image pickup section, due to a filter provided, and makes it possible to provide a light quantity adjusting member in a simple manner technically because the light quantity adjusting member can be positioned at the front portion to be ahead of the image focusing section in the image pickup direction, and assures that a person does not feel, depending on the person, that he or she is photographed as in the case where the cover is positioned in the image focusing section, because the cover is positioned at the front portion to be ahead of the image focusing section in the image pickup direction.

This item further includes that at least one light quantity adjusting section among plural light quantity adjusting sections in the electronic camera described in Item 2 adjusts, due to a filter provided therein, a quantity of incident light entering the image pickup section when positioned at the front portion of the image pickup section in the image pickup direction, and even in this case, the effects of the invention mentioned above can be offered.

Explanation of Item 8

"An electronic camera comprising an image pickup section which photographs a subject, a main body which houses the image pickup section, a reciprocating member provided on the main body to be capable of reciprocating, a cover, and a light quantity adjusting member having a light quantity adjusting section, wherein when the reciprocating member is moved forward or backward, the cover and the light quantity adjusting member move, interlocking with the forward movement or backward movement of the reciprocating member, and thereby both of the cover and the light quantity adjusting section can be positioned at the front portion of the image pickup portion in the image pickup section, the cover, when positioned at the front portion of the image pickup section in the image pickup direction, shields the front portion of the image pickup section in the image pickup direction against light, and the light quantity adjusting section, when positioned at the front portion of the image pickup section in the image pickup direction, adjusts a quantity of incident light entering the image pickup section" makes one rotating member to simply close the front portion of the image pickup section in the image pickup direction for light-shielding when no photographing is conducted, and to simply position the light quantity adjusting section at the front portion of the image pickup section in the image pickup direction and to adjust a quantity of incident light entering the image pickup section when photographing is conducted, which makes the electronic camera to be small in size and low in cost.

Incidentally, light-shielding conducted by the cover is intended not give impression that an operator is being photographed to the operator when the cover is positioned at the front portion of the image pickup section in the image pickup direction, and if the cover is shielded against visible light, it does not matter whether infrared rays and ultraviolet rays are interrupted or not interrupted.

In addition to the light quantity adjusting section of and the cover, objects which do not change a quantity of incident light entering an image pickup section at all such as a large hole provided on the light quantity adjusting section having neither effect for a filter nor effect for an iris, and a portion having thereon nothing (hereinafter referred to as a blank portion) can also be arranged to be positioned at the front portion of the image pickup section in the image pickup direction. Due to this, it is possible to simply adjust an amount of adjustment of a quantity of light because the blank portion and the light quantity adjusting section are different each other in terms of an amount of adjustment of a quantity of light by an amount by which a quantity of light is not reduced by the blank portion. Therefore, one rotating member can simply close and shield the front portion of the image pickup section in the image pickup direction against light when no photographing is conducted, and it can simply adjust an amount of adjustment of a quantity of light when photographing is conducted, which makes the electronic camera to be small in size and low in cost.

Explanation of Item 9

"The electronic camera according to Item 8, wherein the light quantity adjusting member has plural light quantity adjusting sections each differing from others in terms of an amount of adjustment of a quantity of light, and all of the plural light quantity adjusting sections can be positioned at the front portion of the image pickup section in the image pickup direction when the reciprocating member is moved forward or backward" makes it possible to adjust an amount of adjustment of a quantity of light simply, because all of the plural light quantity adjusting sections each differing from others in terms of an amount of adjustment of a quantity of light can be positioned at the front portion of the image pickup section in the image pickup direction when the reciprocating member is moved forward or backward. Therefore, one reciprocating member can simply close and shield the front portion of the image pickup section in the image pickup direction against light when no photographing is conducted, and it can simply adjust an amount of adjustment of a quantity of light when photographing is conducted, which makes the electronic camera to be small in size and low in cost.

Explanation of Item 10

"The electronic camera according to either Item 8 or Item 9, wherein the cover and the reciprocating member are united solidly" makes it possible, due to its structure that the cover and the reciprocating member are united solidly, to reduce the number of constitutional parts, and to realize simply and inexpensively excellent positional accuracy between the cover and the reciprocating member and sure light-shielding by means of the cover when photographing is not conducted.

Explanation of Item 11

"The electronic camera according to either one of Items 8–10, wherein the light quantity adjusting member and the reciprocating member are united solidly" makes it possible, due to its structure that the light quantity adjusting member and the reciprocating member are united solidly, to reduce the number of constitutional parts, and to realize simply and inexpensively excellent positional accuracy between the light quantity adjusting member and the reciprocating member and sure achieving an original amount of light quantity adjustment for the light quantity adjusting section when photographing is conducted.

Explanation of Item 12

"The electronic camera according to Item 8 or Item 9, wherein the cover and the light quantity adjusting member are united with the reciprocating member, and the cover and the light quantity adjusting member are arranged to line up in a single file in the direction of reciprocating movement of the reciprocating member" makes it possible, due to its structure that the cover and the light quantity adjusting member are united with the reciprocating member, to make the electronic camera to be small in size and low in cost further, and to realize simply and inexpensively the excellent positional accuracy among the cover, the light quantity adjusting member and the reciprocating member, and to realize the sure light-shielding of the front portion of the image pickup section in the image pickup direction by means of the cover when photographing is not conducted, and the sure achieving of an original amount of light quantity adjustment for the light quantity adjusting section when photographing is conducted.

Further, it is possible to arrange the cover and the light quantity adjusting section easily so that either of the cover and the light quantity adjusting section may be positioned at the front portion of an image pickup section in the image pickup direction for each forward movement or backward movement of the reciprocating member for the same interval. Due to this arrangement, an operator of an electronic camera can position either the cover or the light quantity adjusting section at the front portion of an image pickup section in the image pickup direction in a natural feeling, and it is possible to simply conduct mechanical control which positions either the cover or the light quantity adjusting section at the front portion of an image pickup section in the image pickup direction by moving the reciprocating member forward or backward in the case where the reciprocating member is moved forward or backward mechanically in place of manually.

Explanation of Item 13

"The electronic camera according to either one of Items 8–12, wherein there is provided an image focusing section which is provided at the front portion of the image pickup section in the image pickup direction and focuses an image of a subject on the image pickup section, and both of the cover and the light quantity adjusting section can be positioned at the front portion of the image focusing section in the image pickup direction by moving the reciprocating member forward or backward, and the light quantity adjusting section, when it is positioned at the front portion of the image pickup section in the image pickup direction, adjusts a quantity of incident light entering the image pickup section, due to a filter provided" makes it sure that a person does not feel, depending on the person, that he or she is photographed as in the case where the cover is positioned in the image focusing section, and no feeling of being photographed is given to a person when the person does not want to be photographed, because the cover is positioned at the front portion to be ahead of the image focusing section in the image pickup direction.

Explanation of Item 14

"An electronic camera having therein an image pickup section for photographing a subject, a main frame housing the image pickup section, a rotating member provided rotatably on the main frame, and a light quantity adjusting member having plural light quantity adjusting sections each being different in terms of amount of light quantity adjustment, wherein the light quantity adjusting member moves straight interlocking with the rotation of the rotating member when the rotating member is rotated, and thereby either of the plural light quantity adjusting sections can be positioned to be ahead of the image pickup section in the image pickup direction" makes it possible to make a mechanism for adjusting an amount of light quantity adjustment to be small in size and to be low in cost, because the light quantity adjusting member moves straight and thereby positions either of the plural light quantity adjusting sections to be ahead of the image pickup section in the image pickup direction. In addition, these can be conducted simply because they are interlocked with a dial to be performed.

In addition to the light quantity adjusting section of and the cover, objects which do not change a quantity of incident light entering an image pickup section at all such as a large hole provided on the light quantity adjusting section having neither effect for a filter nor effect for an iris, and a portion having thereon nothing (hereinafter referred to as a blank portion) can also be arranged to be positioned at the front portion of the image pickup section in the image pickup direction. Due to this, it is possible to simply adjust an amount of adjustment of a quantity of light because the blank portion and the light quantity adjusting section are different each other in terms of an amount of adjustment of a quantity of light by an amount by which a quantity of light is not reduced by the blank portion. Therefore, one rotating member can simply close and shield the front portion of the image pickup section in the image pickup direction against light when no photographing is conducted, and it can simply adjust an amount of adjustment of a quantity of light when photographing is conducted, which makes the electronic camera to be small in size and low in cost.

Explanation of Item 15

"The electronic camera described in Item 14, wherein the plural light quantity adjusting sections are arranged so that either of the light quantity adjusting sections may be positioned to be ahead of the image pickup section in the image pickup direction for each rotation of the rotating member by the same angle" makes it possible for an operator of the electronic camera to position either of the plural light quantity adjusting sections to be ahead of the image pickup section in the image pickup direction with natural feeling, and makes the mechanical control to position either of the plural light quantity adjusting sections to be ahead of the image pickup section in the image pickup direction by rotating the rotating member in the case where the rotating member is rotated not in a manual way but in a mechanical way to be simple.

Explanation of Item 16

"The electronic camera described in Item 14 or Item 15, wherein a second image pickup section positioned to be ahead of the image pickup section in the image pickup direction and a first image pickup section positioned to be ahead of the second image pickup section in the image pickup direction are provided so that an image of the subject may be focused on the image pickup section, the plural light quantity adjusting sections are different each other in terms of amount of light quantity adjustment because of a fixed iris provided on each of the light quantity adjusting sections, and the plural light quantity adjusting sections of the light quantity adjusting member are positioned between the first image pickup section and second image pickup section" makes it possible not to provide anything but a fixed iris for making the plural light quantity adjusting sections to be different each other in terms of amount of light quantity adjustment because the plural light quantity adjusting sections of the light quantity adjusting member are positioned between the first image pickup section and the second image pickup section both for focusing an image of a subject on the image pickup section, and makes it possible to provide plural light quantity adjusting sections each being different in terms of amount of light quantity adjustment by providing a fixed iris alone, resulting in adjustment of an amount of light quantity adjustment which can be conducted in a simpler structure and in an electronic camera which can be made to be smaller in size and lower in cost.

Explanation of Item 17

"The electronic camera described in either one of Items 14–16, wherein the rotating member is a disk-disk-shaped dial, and the center of the disk is a rotational center" makes it easy to operate when rotating the dial manually, and makes the dial to be easily rotated mechanically when the dial is rotated mechanically, in which the rotating member is hardly deformed when it is rotated.

It is possible to arrange the cover and the light quantity adjusting sections simply so that either of the cover and the plural light quantity adjusting sections may be positioned to be ahead of the image pickup section in the image pickup direction for each rotation of the dial by the same angle, whereby an operator of the electronic camera can position either of the cover and the light quantity adjusting sections to be ahead of the image pickup section in the image pickup direction with natural feeling, and it is possible to conduct simply the mechanical control to position either of light quantity adjusting sections to be ahead of the image pickup section in the image pickup direction by rotating the dial when the dial is rotated mechanically.

Explanation of Item 18

"The electronic camera described in either one of Items 14–17, wherein there is provided a cover which opens or closes the front portion of the image pickup section in the image pickup direction" makes it possible to cover the front portion of the image pickup section in the image pickup direction.

Incidentally, light-shielding conducted by the cover is intended not give impression that an operator is being photographed to the operator when the cover is positioned at the front portion of the image pickup section in the image pickup direction, and if the cover is shielded against visible light, it does not matter whether infrared rays and ultraviolet rays are interrupted or not interrupted.

Explanation of Item 19

An electronic camera, comprising:

a photographing section for photographing a subject;

a casing in which the photographing section is accommodated;

a plurality of light amount regulating members for regulating a light amount incident to the photographing section, wherein the light amount regulated by each light amount regulating member is different from others;

a cover for covering the photographing section;

a rotating member mounted ratably to the casing; wherein the plurality of light amount regulating members and the cover are attached to the rotating member so that each of the plurality of light amount regulating members and the cover member is located at the front of the photographing section in the photographing direction by rotating the rotating member.

With the structure of Item 19, the following advantages can be obtained.

1. Since opening and closing of the cover and light quantity adjustment can be conducted through the same method, less time and labor are required, compared with an occasion wherein opening and closing of the cover and light quantity adjustment are conducted separately. When the cover and the light quantity adjusting section are arranged on the same circumference of the rotating member, the width of the total range of movement is less, compared with an occasion wherein the cover and the light quantity adjusting section are arranged on a straight line.
2. When the rotation axis is in parallel with an optical axis, an projected area of the camera viewed from the front of a lens is larger, but the projected area of the camera is minimum when the rotation axis is perpendicular to the optical axis. (This is advantageous when the design of the camera viewed from its front is important as in the case of a personal computer camera.)
3. Since the dial which serves also as a cover covering the top surface is used for operation, the number of parts is reduced and functioning is stabilized.
4. The dial, the cover and the light quantity adjusting section which united to be one body makes the number of parts to be small.
5. The structure is one which can be realized even when light quantity adjusting mechanism can not be incorporated in a small-sized lens system.
6. Since the rotation angle for switching of light quantity is the same for all steps, graduations for manual operation can be marked at regular intervals.
7. Since the light quantity adjustment is conducted at the position where a light flux is converged, the light quantity adjusting mechanism and a camera can be made small. Since a diameter of the open aperture is represented by a fixed iris, optical performance for the open aperture is stabilized. The number of functioning portions in the light quantity adjusting mechanism is small.

Explanation of Terminology

A light quantity adjusting section is one to adjust by reducing a quantity of incident light entering the image pickup section, and it may be either one which reduces a quantity of incident light without relying on a wave length like an ND filter or a fixed iris, or one which reduces a quantity of incident light in a part of a wave length area of incident light entering the image pickup section like a color filter or an LB filter. In the present invention, the light quantity adjusting section comprises a transparent filter whose transmittance is 100%.

An amount of light quantity adjustment is an amount by which a quantity of incident light entering the image pickup section when the light quantity adjusting section is positioned to be ahead of the image pickup section in the image pickup direction. For example, when the light quantity adjusting section is of the type to adjust a quantity of incident light entering the image pickup section by means of a fixed iris, the amount of light quantity adjustment is one wherein a quantity of light that is ¼ times that for F4 is for F8. When the light quantity adjusting section is of the type to adjust a quantity of incident light entering the image pickup section by means of a filter, the amount of light quantity adjustment is one wherein a quantity of light that is ¼ times that for a filter with transmission factor of 80% is for a filter with transmission factor of 20%, and a quantity of light that is ¼ times that for a filter with transmission factor of 80% is for a void portion.

DETAILED DESCRIPTION OF THE PREFERRED EMBODIMENT

Figure 1:
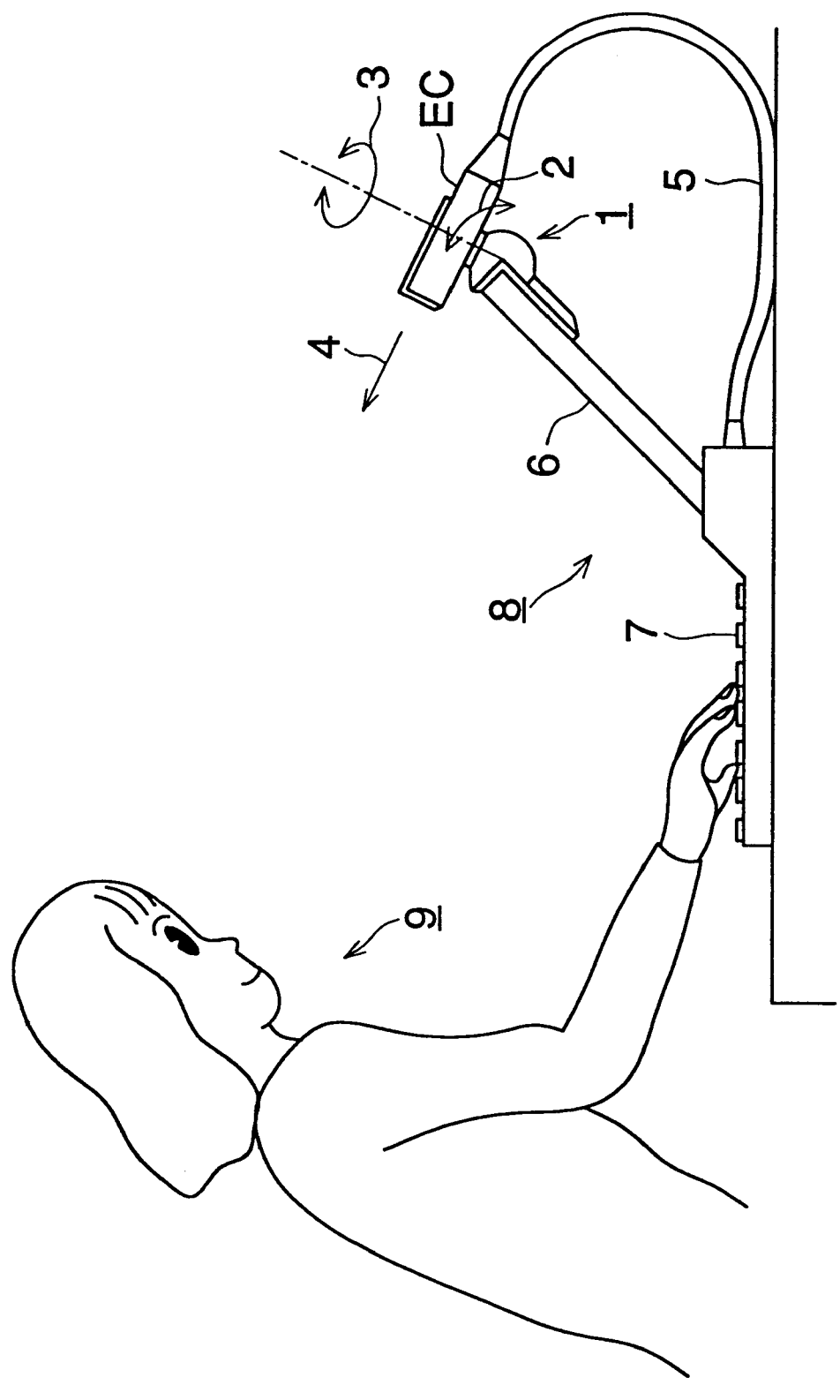
FIG. 1 is a schematic side view showing how electronic camera EC in the embodiment is mounted on image plane member 6 of notebook computer 8 by mounting member 1.

A concrete example of the invention is shown below as an embodiment to which, however, the invention is not limited. In the embodiment, there are used conclusive expressions in terms of terminology which, however, show preferable examples of the invention and do not define the meaning of the terminology or technical scope of the invention.

Embodiment 1

The present embodiment represents an embodiment of an electronic camera of the invention. First, an example of how to utilize an electronic camera of the present embodiment will be explained, referring to FIG. 1 which is a schematic side view showing how electronic camera EC is mounted on image plane member 6 of notebook computer 8 by mounting member 1.

Notebook computer 8 has therein main frame 7 provided with a key board and image plane member 6 attached on an end portion of the main frame 7 so that the end portion may be opened and closed. The image plane member 6 is provided with an image plane of a liquid crystal type.

Electronic camera EC is an electronic camera having the structure stated later, and it is provided with cord 5 connected to its main frame. A connector provided on the tip of the cord 5 connects the electronic camera to main frame 7 of notebook computer 8. An image obtained by an image pickup section housed in the electronic camera is processed therein and is sent to the notebook computer 8 through the cord 5.

Mounting member 1 is a member which makes it possible, when it is mounted on image plane member 6 of notebook computer 8, for electronic camera EC to be mounted on the image plane member 6 of the notebook computer 8. Since the electronic camera EC can be mounted on the image plane member 6 of the notebook computer 8 by the mounting member 1, a face of operator 9 who is almost in front of the electronic camera EC can be photographed by the electronic camera EC even when the operator 9 is operating while observing an image plane of the notebook computer 8, and it can be prevented that whereabouts of the electronic camera EC is lost, because the electronic camera EC is mounted on prescribed mounting member 1.

Further, since the electronic camera EC in the present embodiment is small in size and light in weight, it is possible to adjust freely by the mounting member 1 to rotating direction 2 or rotating direction 3 shown in FIG. 1 even when the mounting member 1 is simple in structure and low in cost.

Figure 2:
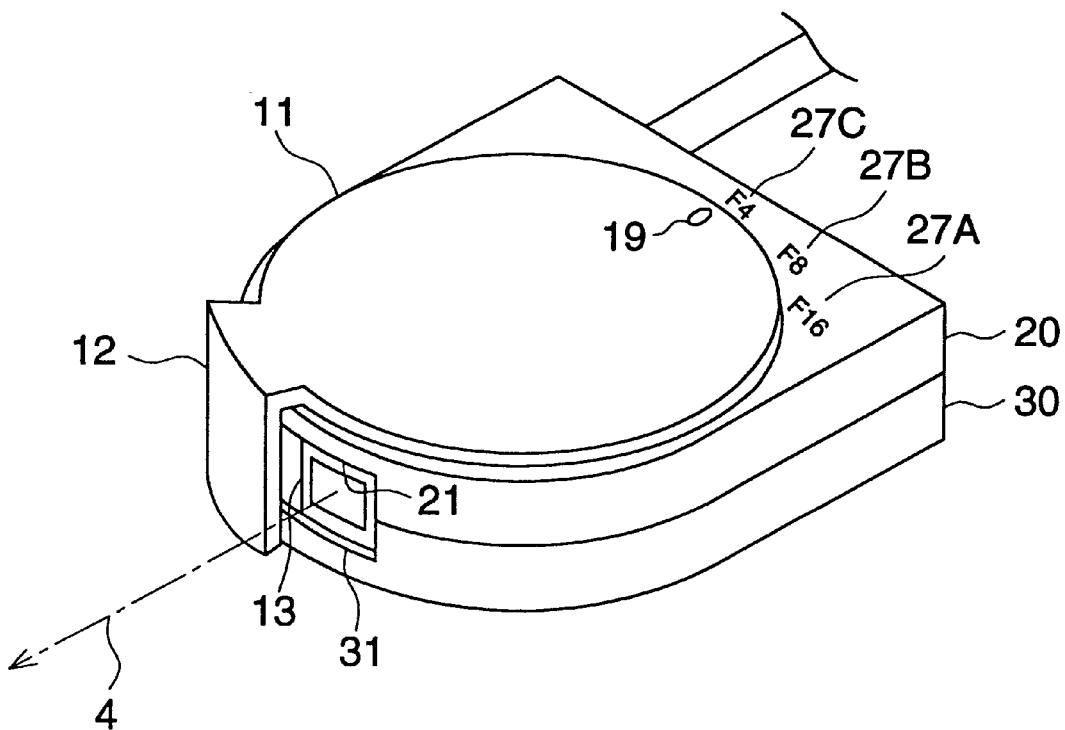
FIG. 2 is a perspective view of electronic camera EC in Embodiment 1 viewed from the upper left on the front of image pickup direction 4 of image pickup section 43.
Figure 3:
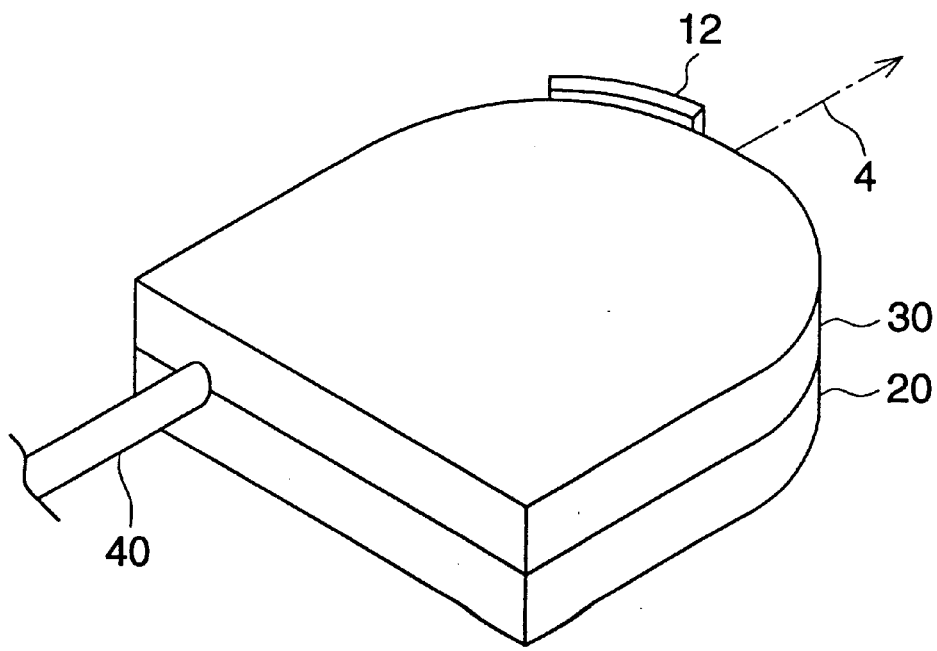
FIG. 3 is a perspective view of electronic camera EC in Embodiment 1 viewed from the direction just opposite to that in FIG. 2.
Figure 4:
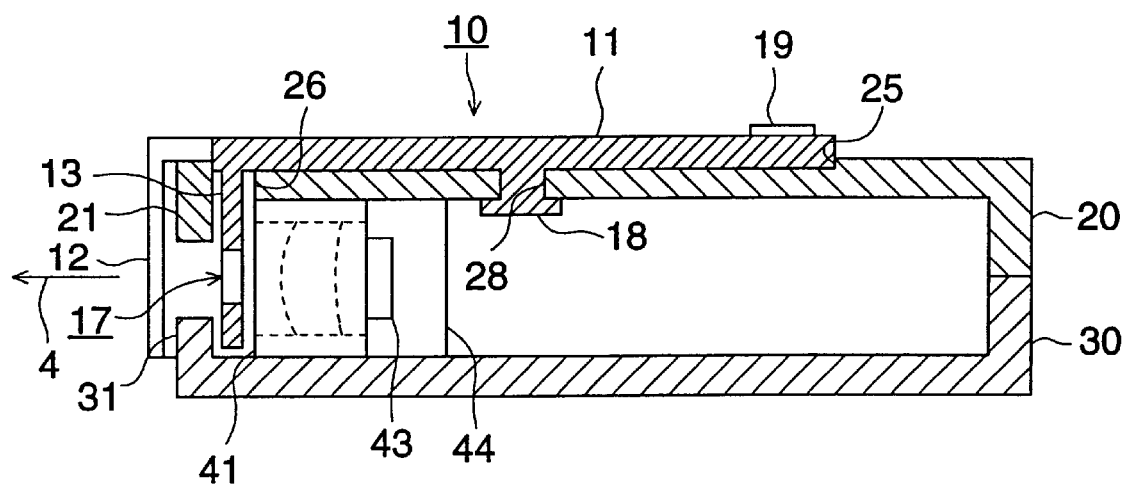
FIG. 4 is a central section on the side of electronic camera EC in Embodiment 1.
Figure 5:
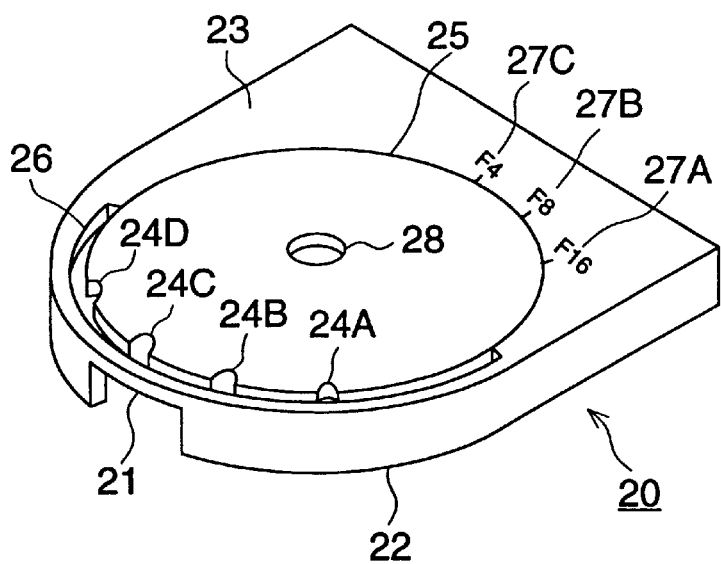
FIG. 5 is a perspective view of main frame upper member 20 in Embodiment 1 viewed from the upper left on the front of image pickup direction 4 of image pickup section 43.
Figure 6:
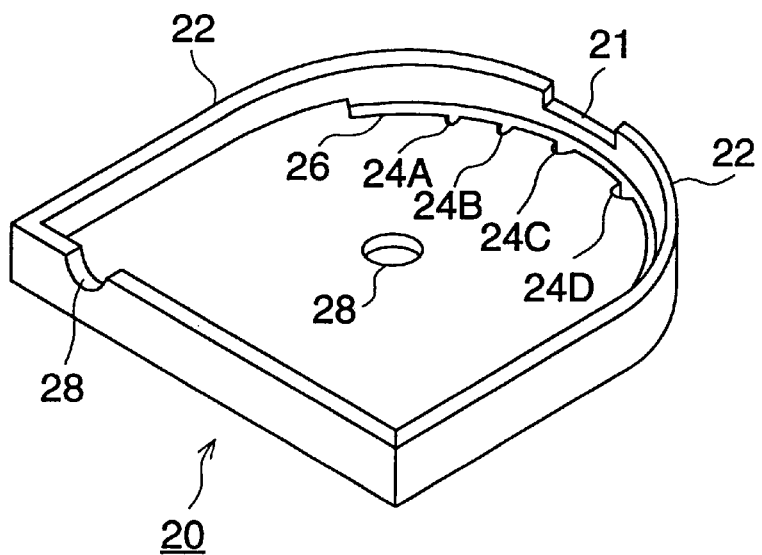
FIG. 6 is a perspective view of main frame upper member 20 in Embodiment 1 viewed from the direction just opposite to that in FIG. 5.
Figure 7:
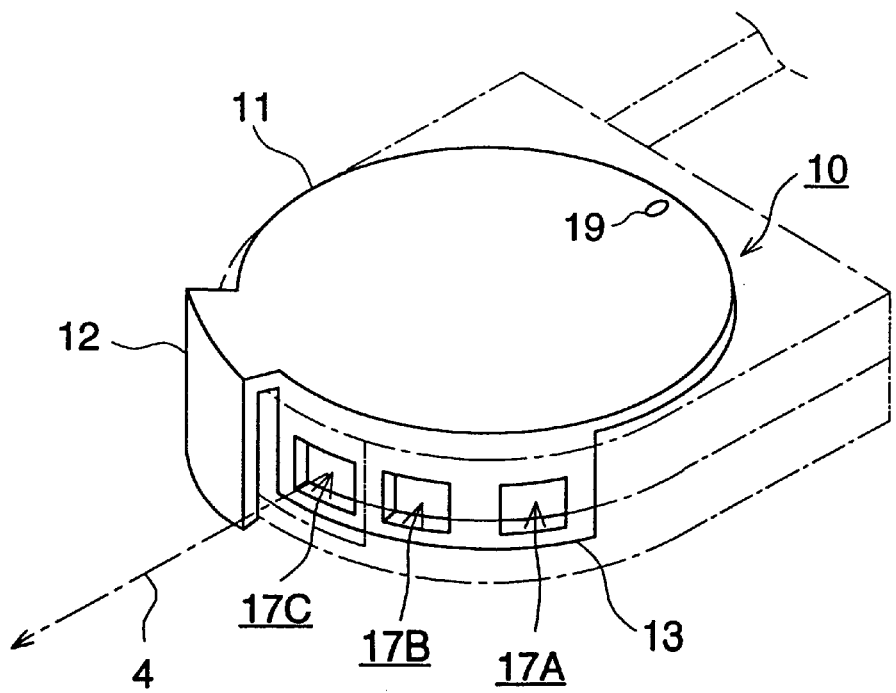
FIG. 7 is a perspective view of dial member 10 in Embodiment 1 viewed from the upper left on the front of image pickup direction 4 of image pickup section 43.
Figure 8:
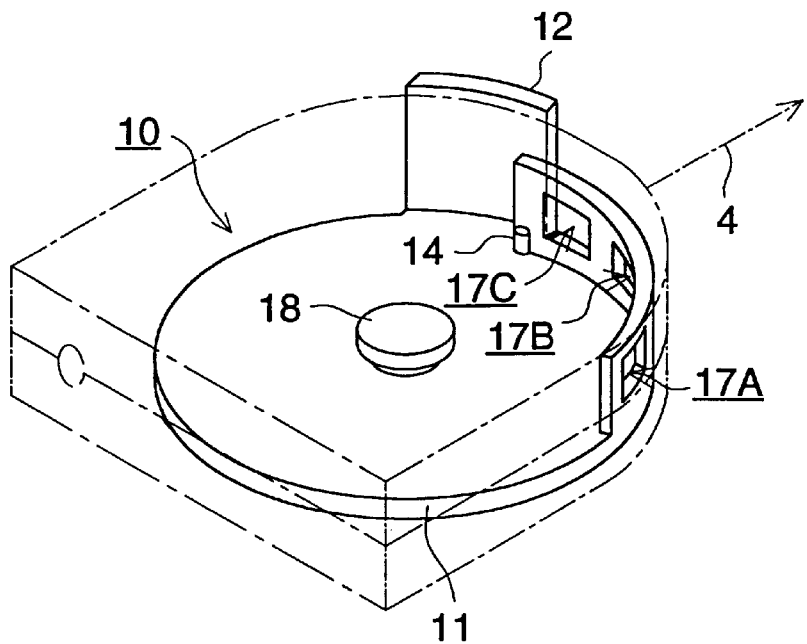
FIG. 8 is a perspective view of dial member 10 in Embodiment 1 viewed from the direction just opposite to that in FIG. 7.

Next, electronic camera EC in the present embodiment will be explained as follows, referring to FIG. 2 which is a perspective view of electronic camera EC viewed from the upper left on the front of image pickup direction 4 of image pickup section 43, FIG. 3 which is a perspective view of electronic camera EC viewed from the direction just opposite to that in FIG. 2, FIG. 4 which is a central section on the side of electronic camera EC, FIG. 5 which is a perspective view of main frame upper member 20 viewed from the upper left on the front of image pickup direction 4 of image pickup section 43, FIG. 6 which is a perspective view of main frame upper member 20 viewed from the direction just opposite to that in FIG. 5, FIG. 7 which is a perspective view of dial member 10 viewed from the upper left on the front of image pickup direction 4 of image pickup section 43, and FIG. 8 which is a perspective view of dial member 10 viewed from the direction just opposite to that in FIG. 7.

A main frame of electronic camera EC is composed of main frame lower member 30 and main frame upper member 20 and houses image pickup section 43. The frame lower member 30 holds image pickup section holding member 44 which holds the image pickup section 43. Image focusing section 41 is held by the frame lower member 30 to be ahead of and adjacent to the image pickup section 43 in the image pickup direction 4 on the image pickup section holding member 44. The image focusing section 41 focuses an image of a subject on the image pickup section 43. The image pickup section 43 which is provided with 2-dimensional CCD sensor conducts image pickup of an image of a subject focused on the 2-dimensional CCD by the image focusing section 41, and sends the image after image pickup thus obtained to an unillustrated image processing section. Then, the image processing section conducts prescribed image processing, and sends images obtained through image processing to an equipment such as a notebook computer through cord 5.

Opening lower portion 31 is provided to be ahead of the image pickup section 43 in the image pickup direction 4 on the main frame lower member 30, and opening upper portion 21 is provided to be ahead of the image pickup section 43 in the image pickup direction 4 on the main frame upper member 20, and an opening for image pickup is formed to be ahead of the image pickup section 43 in the image pickup direction by these opening lower portion 31 and opening upper portion 21.

At the central portion of the main frame upper member 20, there is provided dial shaft hole 28 which holds rotatably dial shaft 18 which goes through the dial shaft hole 28. The dial shaft 18 is provided on the center portion on the bottom surface of disk-shaped dial 11 to be connected thereto, and a center axis of the dial shaft 18 and that of the dial 11 are coaxial each other. Due to this, the dial 11 is attached rotatably around the center axis of the dial shaft hole on the main frame upper member 20. Namely, dial member 10 is attached rotatably on the main frame upper member 20.

The dial member 10 is one wherein dial 11, cover 12 and light quantity adjusting member 13 having therein plural light quantity adjusting sections 17 each being different in terms of amount of light quantity adjustment are united solidly. The light quantity adjusting member 13 is provided on the circumferential bottom surface of the disk-shaped dial 11, and a distance between the surface of the light quantity adjusting member 13 and a center axis of the dial 11 is constant and a distance between the reverse side of the light quantity adjusting member 13 and a center axis of the dial 11 is constant. The cover 12 is provided at the position which is outside the circumferential portion of the dial 11, and a distance between the surface of the cover 12 and a center axis of the dial 11 is constant and a distance between the reverse side of the cover 12 and a center axis of the dial 11 is constant. A main frame composed of main frame upper member 20 and main frame lower member 30 mainly is of a shape which approximates to a pillar having a section in a shape wherein a semicircle whose center is on a center axis of dial shaft hole 28 and a rectangle whose longer side is a diameter of the semicircle are combined. Therefore, the light quantity adjusting member 13 can slide smoothly along arc-shaped slit 26 on the main frame upper member 20, whereby the cover 12 can smoothly move outside the main frame upper member 20.

The cover 12 and plural light quantity adjusting sections 17A–17C are arranged in a line in the circumferential direction of the dial 11. Accordingly, either one of the cover 12 and plural light quantity adjusting sections 17A–17C can rotate integrally with the dial 11 and can be positioned to be ahead of the image pickup section 43 in the image pickup direction.

Due to this, only rotation of the dial 11 makes it possible that image pickup direction 4 of the image pickup section 43 is shielded by the cover 12 against light in the case of no photographing, and an amount of light quantity adjustment is adjusted in the case of photographing, which makes an electronic camera to be small in size and low in cost, as well as to be operated simply.

A plurality of light quantity adjusting sections 17A–17C are provided on the circumferential portion of the dial 11 having the constant distance from the central axis of the dial 11 of dial member 10, and the central axis of dial shaft hole 28 on the dial member 10 is arranged to be perpendicular to the image pickup optical axis of the image pickup section 43. Therefore, when plural light quantity adjusting sections 17A–17C are positioned to be ahead of the image focusing section 42 in the photographing direction, a distance between plural light quantity adjusting sections 17A–17C and image-focusing section 42 remains the same, and a distance between plural light quantity adjusting sections 17A–17C and image pickup section 43 remains the same.

Plural light quantity adjusting sections 17A–17C each being provided with a filter which is different from others in terms of transmission factor are different each other in terms of amount of light quantity adjustment. For example, when an open-F number of image focusing section 41 is 2.8, light quantity adjusting sections 17A is provided with a filter with transmission factor of 50% to obtain an amount of light quantity adjustment equivalent to F4, light quantity adjusting sections 17B is provided with a filter with the transmittance of 12.5% to obtain an amount of light quantity adjustment equivalent to F8, and light quantity adjusting sections 17B is provided with a filter with the transmittance of 3.13% to obtain an amount of light quantity adjustment equivalent to F16. Due to this, it is possible to adjust an amount of light quantity adjustment even at the position which is ahead of the image focusing section 41 in the image pickup direction because plural light quantity adjusting sections 17A–17C vary in terms of amount of light quantity adjustment by being provided with filters. Therefore, the cover 12 and plural light quantity adjusting sections 17A–17C can be positioned to be ahead of the image focusing section 41 in the image pickup direction 4, and the cover 12 and plural light quantity adjusting sections 17A–17C can be provided in a manner which is technically simple. Further, filters provided on plural light quantity adjusting sections 17A–17C are only different each other in terms of transmission factor and they do not change image focusing capability remarkably. Therefore, it is easy to design and manufacture the image focusing section 41.

Incidentally, in place of the example mentioned above, it is also possible to employ an arrangement wherein light quantity adjusting section 17A replaced with a large hole portion which does not adjust light quantity at all without providing a filter when an open-F number of image focusing section 41 is F4, a filter with transmission factor of 25% is provided on light quantity adjusting sections 17B to obtain an amount of light quantity adjustment equivalent to F8, and a filter with transmission factor of 6.25% is provided on light quantity adjusting sections 17B to obtain an amount of light quantity adjustment equivalent to F16. Due to this, it is possible to reduce cost because light quantity can be adjusted in plural steps including a portion where no filter is provided.

Main frame upper member 20 is mainly composed of top face member 23 in a shape in which a semicircle and a rectangle whose longer side is a diameter of the semicircle are combined. Opening upper part 21 is provided on wall 22 located to be ahead of image pickup section 43 in the image pickup direction 4 to form an opening for image pickup.

Further, circular and slightly-recessed portion 25 whose center agrees in terms of position with that of the semicircle that forms the top face member 23 is provided so that dial 10 of dial member 10 may rotate while sliding. Light quantity adjustment amount indicators 27A–27C indicate an amount of light quantity adjustment corresponding to light quantity adjusting sections 17A–17C which are provided outside the circular recessed portion 25 at regular intervals in terms of angle. Indication may also be of an F number such as F4:F8:F16, for example, pretending that a quantity of light is adjusted by an iris as shown in FIG. 5. There is provided so that indicating section 19 provided on the top face of dial 11 can indicate light quantity adjustment amount indicators 57A–57C which show amounts of light quantity adjustment of light quantity adjusting sections 27A–27C positioned to be ahead of image pickup section 83 in the image pickup direction 4.

Arc-shaped slit hole 26 is provided along the outer circumference on the side of the image pickup direction of the circular recessed portion 25 so that light quantity adjusting member 13 of dial member 10 may be inserted in the arc-shaped slit hole 26 to rotate. There are formed recessed portions 24A–24D which engage with projected portion 14 which is formed on the side of the light quantity adjusting member 13. The recessed portions 24A–24D are formed in a way that light quantity adjusting section 17A of dial member 10 is positioned to be ahead of image pickup section 43 in the image pickup direction 4 when the projected portion 14 is engaged with the recessed portion 24A, light quantity adjusting section 17B of dial member 10 is positioned to be ahead of image pickup section 43 in the image pickup direction 4 when the projected portion 14 is engaged with the recessed portion 24B, light quantity adjusting section 17C of dial member 10 is positioned to be ahead of image pickup section 43 in the image pickup direction 4 when the projected portion 14 is engaged with the recessed portion 24C, and cover 12 of dial member 10 is positioned to be ahead of image pickup section 43 in the image pickup direction 4 when the projected portion 14 is engaged with the recessed portion 24D.

Due to this, it is possible to easily position light quantity adjusting sections 17A–17C of light quantity adjusting member 13 and a cover to be ahead of image pickup section 43 in the image pickup direction 4 when dial member 10 is rotated by an operator. Owing to this, an operator of an electronic camera can position, with natural feeling, either of cover 12 and plural light quantity adjusting sections 17A–17C to be ahead of image pickup section 43 in the image pickup direction 4.

As a variation of the present embodiment, is also acceptable that a motor to rotate dial 11 is provided, for example, so that dial 11 may be rotated by the motor based on control signals coming from notebook computer 8, without being rotated manually. Even in this case, it is possible to position either of the cover 12 and plural light quantity adjusting sections 17A–17C to be ahead of the image pickup section 43 in the image pickup direction 4 only by rotating dial 11 by a certain angle. It is therefore possible to simply carry out the control to position either of the cover 12 and plural light quantity adjusting sections 17A–17C to be ahead of the image pickup section 43 in the image pickup direction 4.

Embodiment 2

Figure 9:
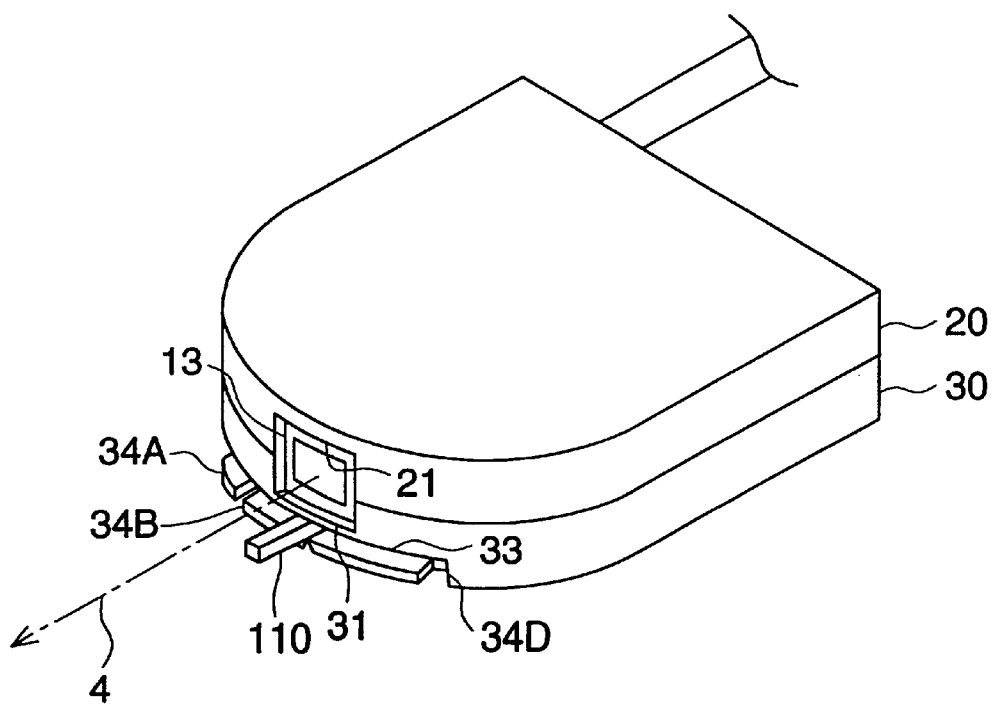
FIG. 9 is a perspective view of electronic camera EC in Embodiment 2 viewed from the upper left on the front of image pickup direction 4 of image pickup section 43.
Figure 10:
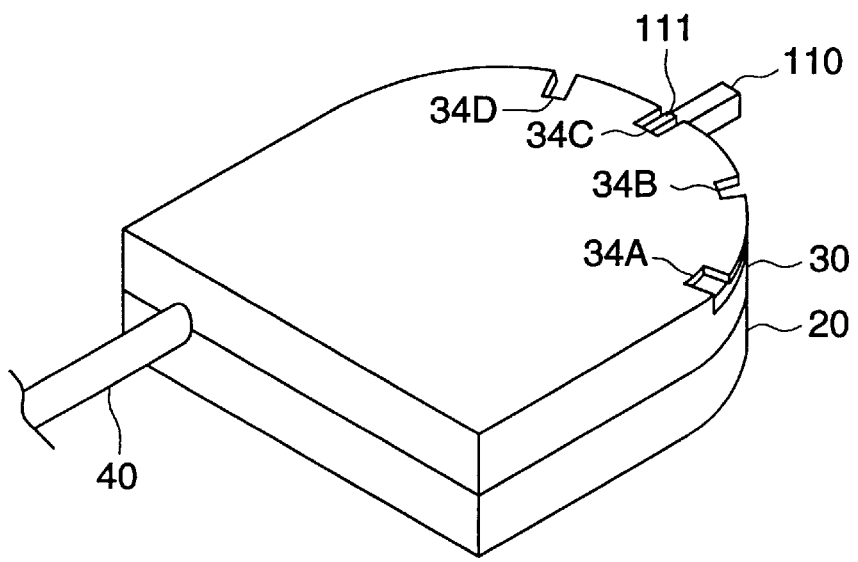
FIG. 10 is a perspective view of electronic camera EC in Embodiment 2 viewed from the direction just opposite to that in FIG. 9.
Figure 12:
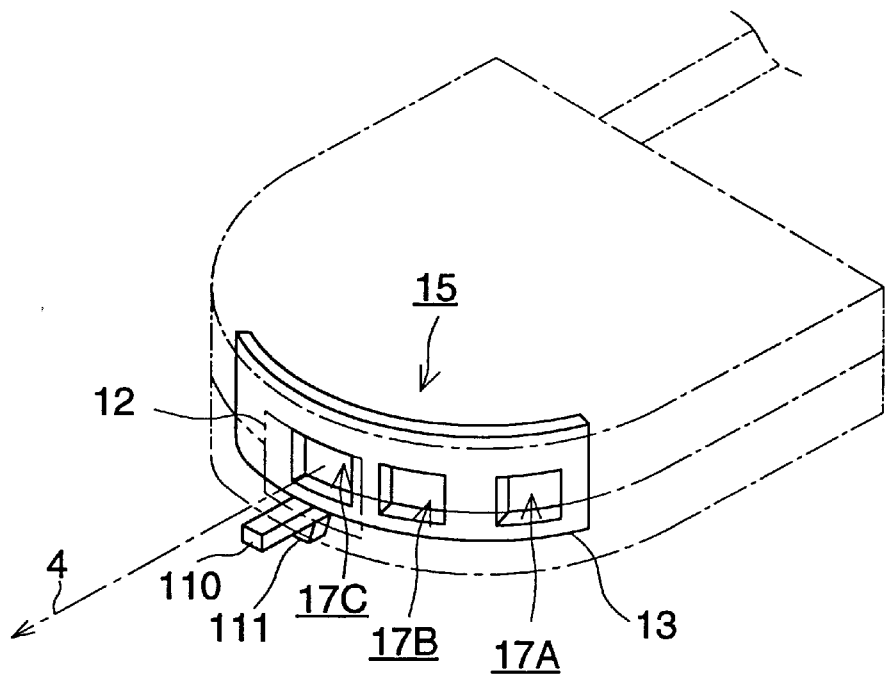
FIG. 12 is a perspective view of reciprocating member 15 in Embodiment 2 viewed from the upper left on the front of image pickup direction 4 of image pickup section 43.
Figure 13:
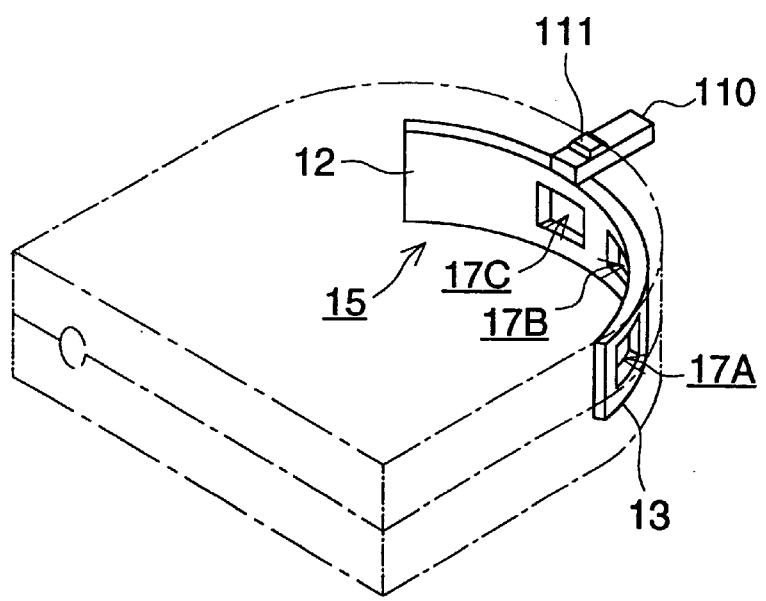
FIG. 13 is a perspective view of reciprocating member 15 in Embodiment 2 viewed from the direction just opposite to that in FIG. 12.

The present embodiment is one for an electronic camera of the invention. How to utilize an electronic camera of the present embodiment is the same as that in Embodiment 1. First, the structure of electronic camera EC in the present embodiment will be explained as follows, referring to FIG. 9 which is a perspective view of electronic camera EC viewed from the upper left on the front of image pickup direction 4 of image pickup section 43, FIG. 10 which is a perspective view of electronic camera EC viewed from the direction just opposite to that in FIG. 9, FIG. 11 which is a central section on the side of electronic camera EC, FIG. 12 which is a perspective view of reciprocating member 15 viewed from the upper left on the front of image pickup section 43 in the image pickup direction 4, and FIG. 13 which is a perspective view of reciprocating member 15 viewed from the direction just opposite to that in FIG. 12. In each of FIGS. 12 and 13, an outline of the whole is shown with one-dot chain lines.

Figure 11:
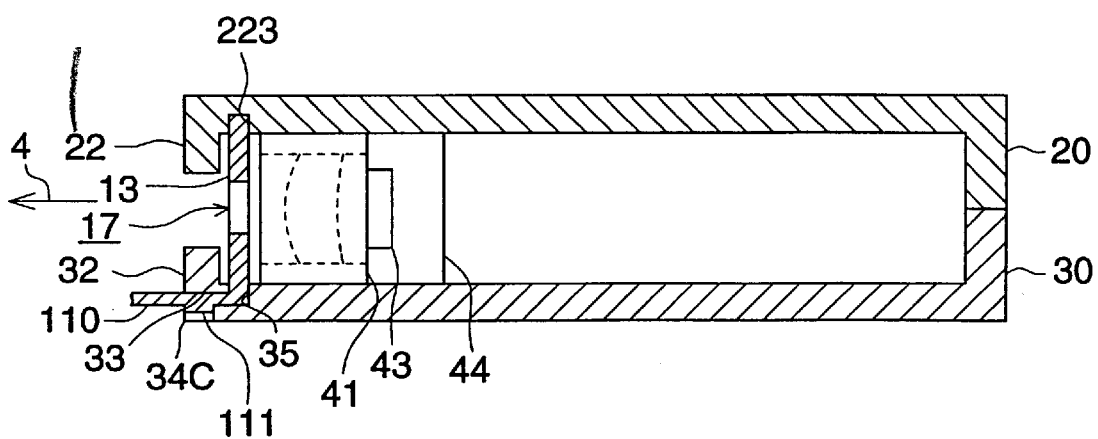
FIG. 11 is a central section on the side of electronic camera EC in Embodiment 2.

First, an image pickup mechanism of the electronic camera will be explained based on FIG. 11. Image pickup section 43 has therein a 2-dimensional CCD sensor and is held by image pickup section holding member 44. The image pickup section 43 picks up images of a subject with the 2-dimensional CCD sensor and sends pickup images thus obtained to an unillustrated image processing section. Then, the image processing section conducts prescribed image processing and sends the pickup images thus processed to an equipment such as a notebook computer or the like through cord 5.

A main frame of electronic camera EC is composed of main frame lower member 30 and main frame upper member 20, and the main frame composed of the frame lower member 30 and main frame upper member 20 houses image pickup section 43. The frame lower member 30 holds image pickup section holding member 44 which holds the image pickup section 43. Image focusing section 41 is held by the frame lower member 30 to be ahead of and adjacent to the image pickup section 43 in the image pickup direction 4 on the image pickup section holding member 44. The image focusing section 41 focuses an image of a subject on the image pickup section 43.

A main frame composed of main frame upper member 20 and main frame lower member 30 is of a shape which approximates to a pillar having a section in a shape wherein a semicircle and a rectangle whose longer side is a diameter of the semicircle are combined. The image pickup direction 4 of the image pickup section 43 is a direction which passes through the center of the semicircle and is perpendicular to the center axis of a pillar forming a shape of the main frame, and it the direction perpendicular to a diameter of the semicircle on the side of the semicircle. Am opening for image pickup is formed to be ahead of image pickup section 43 in the image pickup direction 4. To be concrete, opening lower portion 32 is provided to be ahead of image pickup section 43 of main frame lower member 30 in the image pickup direction 4, and opening upper portion 22 is provided in the same way to be ahead of image pickup section 43 of main frame upper member 20 in the image pickup direction 4, and these opening lower portion 31 and opening upper portion 21 form an opening for image pickup.

Further, there is provided sliding groove 223 on the image pickup direction 4 side on the bottom surface of main frame upper member 20. A distance between an inner side wall of sliding groove 223 and the center axis of a pillar form forming a shape of the main frame is constant, and a distance between an outer side wall of sliding groove 223 and the center axis of a pillar form forming a shape of the main frame is constant. Namely, the sliding groove 223 is on an arc whose center is on the center axis of the pillar forming a shape of the main frame. There are provided arc-shaped slit portion 35 and fan-shaped slit portion 33 provided to be linked with the arc-shaped slit portion 35 on the image pickup direction 4 side on the top surface of main frame lower member 30. An inner side wall and an outer side wall both of the arc-shaped slit portion 35 are of the same distance from the center axis of a pillar form forming a shape of the main frame. The fan-shaped slit portion 33 is a slit which is spread out in the radial direction from the bottom portion of the arc-shaped slit portion 35. Reciprocating member 15 supported to be capable of reciprocating is provided to be surrounded by these sliding groove 223, arc-shaped slit portion 35 and fan-shaped slit portion 33.

The reciprocating member 15 is one wherein cover 12 and light quantity adjusting member 13 having therein plural light quantity adjusting sections 17A–17C each being different from others in terms of amount of light quantity adjustment are united solidly. A distance between an inner surface of the reciprocating member 15 and the center axis of a pillar form forming a shape of the main frame is constant, and a distance between an outer surface of the reciprocating member 15 and the center axis of a pillar form forming a shape of the main frame is constant, and lever 110 is provided on a part of the bottom surface of the reciprocating member 15. Therefore, the reciprocating member 15 can move smoothly along the inside of each of the sliding groove 223 provided on the main frame upper member 20, arc-shaped slit portion 35 and fan-shaped slit portion 33 both provided on the main frame lower member 30.

The cover 12 and plural light quantity adjusting sections 17A–17C are arranged to form a line in the reciprocating direction of the reciprocating member 15. Accordingly, either one of the cover 12 and plural light quantity adjusting sections 17A–17C can be moved forward or backward solidly with the reciprocating member 15 to be positioned to be ahead of the image pickup section 43 in the image pickup direction.

Due to this, forward movement or backward movement of the reciprocating member 15 alone makes it possible to shield image pickup direction 4 of image pickup section 43 against light with cover 12 when no photographing is performed, and to adjust an amount of light quantity adjustment when photographing is performed, which makes an electronic camera to be small in size, low in cost and easy to operate.

Since the plural light quantity adjusting sections 17A–17C are arranged so that a distance between them and the center axis of a pillar form forming a shape of the main frame is constant, and the center axis of a pillar form forming a shape of the main frame is perpendicular to an image pickup optical axis of the image pickup section 43, a distance between plural light quantity adjusting sections 17A–17C and image-focusing section 41 remains the same, and a distance between plural light quantity adjusting sections 17A–17C and image pickup section 43 remains the same. Further, the plural light quantity adjusting sections 17A–17C are provided with filters each being different from others in terms of transmission factor in the same way as in Embodiment 1. These filters are used by the plural light quantity adjusting sections 17A–17C to adjust an amount of incident light entering the image pickup section 43. Owing to this, it is easy to design and manufacture image focusing section 41 because the filters provided on the plural light quantity adjusting sections 17A–17C are just different each other in terms of transmission factor and they do not change image focusing capability remarkably.

Recessed portions 34A–34D which engage with projected portion 111 formed on the bottom part of lever 110 formed on a part of the bottom surface of the reciprocating member 15 are formed at regular intervals in terms of angular position on the bottom side of the fan-shaped slit portion 33 on main frame lower member 30. The recessed portions 24A–24D are formed in a way that light quantity adjusting section 17A of reciprocating member 15 is positioned to be ahead of image pickup section 43 in the image pickup direction 4 when the projected portion 14 is engaged with the recessed portion 24A, light quantity adjusting section 17B of reciprocating member 15 is positioned to be ahead of image pickup section 43 in the image pickup direction 4 when the projected portion 14 is engaged with the recessed portion 24B, light quantity adjusting section 17C of reciprocating member 15 is positioned to be ahead of image pickup section 43 in the image pickup direction 4 when the projected portion 14 is engaged with the recessed portion 24C, and cover 12 of reciprocating member 15 is positioned to be ahead of image pickup section 43 in the image pickup direction 4 when the projected portion 14 is engaged with the recessed portion 24D. Due to this, it is possible to easily position light quantity adjusting sections 17A–17C of light quantity adjusting member 13 and a cover to be ahead of image pickup section 43 in the image pickup direction 4 when the reciprocating member 15 is moved forward or backward by an operator.

As a variation of the present embodiment, is also acceptable that a motor to move the reciprocating member 15 is provided, for example, so that the reciprocating member 15 may be moved forward or backward by the motor based on control signals coming from notebook computer 8, without being moved manually. Even in this case, it is possible to position either of the cover 12 and plural light quantity adjusting sections 17A–17C to be ahead of the image pickup section 43 in the image pickup direction 4 only by moving the reciprocating member 15 forward or backward for a certain distance. It is therefore possible to simply carry out the control to position either of the cover 12 and plural light quantity adjusting sections 17A–17C to be ahead of the image pickup section 43 in the image pickup direction 4.

Embodiment 3

The present embodiment is one for an electronic camera of the invention. How to utilize an electronic camera of the present embodiment is the same as that in Embodiment 1.

Figure 14:
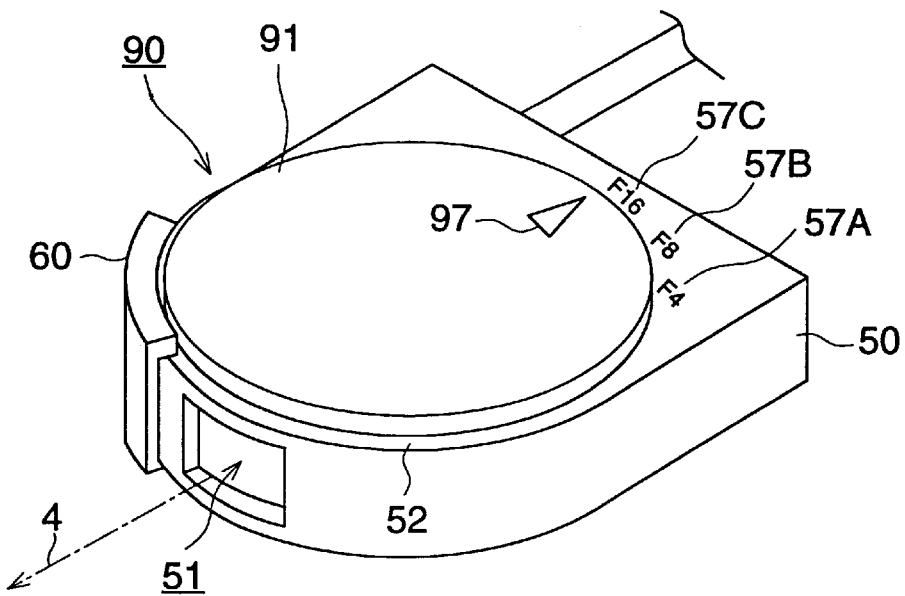
FIG. 14 is a perspective view of electronic camera EC in Embodiment 3 viewed from the upper left on the front of image pickup direction 4 of image pickup section 83.
Figure 15:
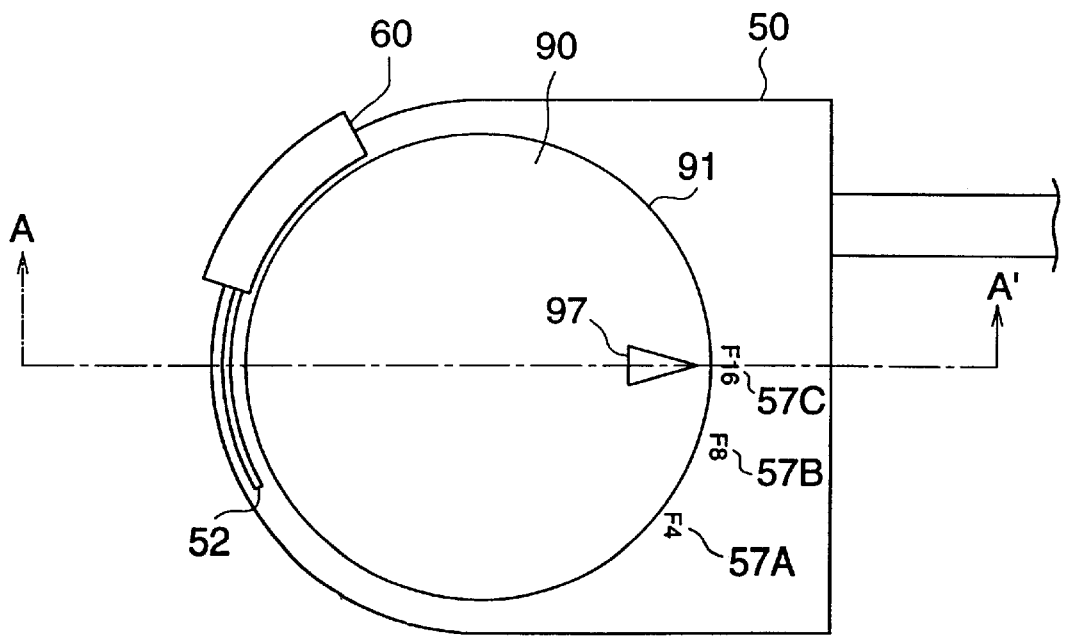
FIG. 15 is a top view of electronic camera EC in Embodiment 3.
Figure 16:
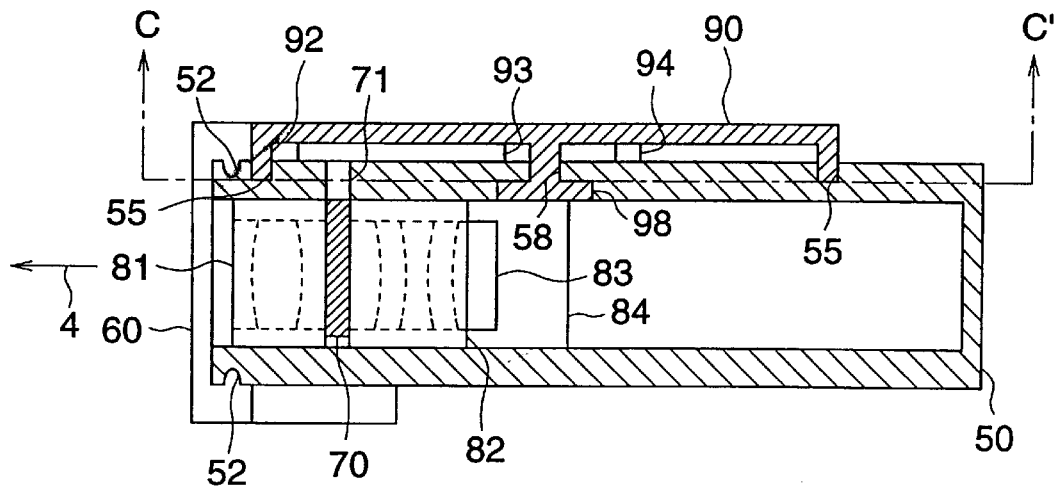
FIG. 16 is a central section on the side of electronic camera EC in Embodiment 3.
Figure 17:
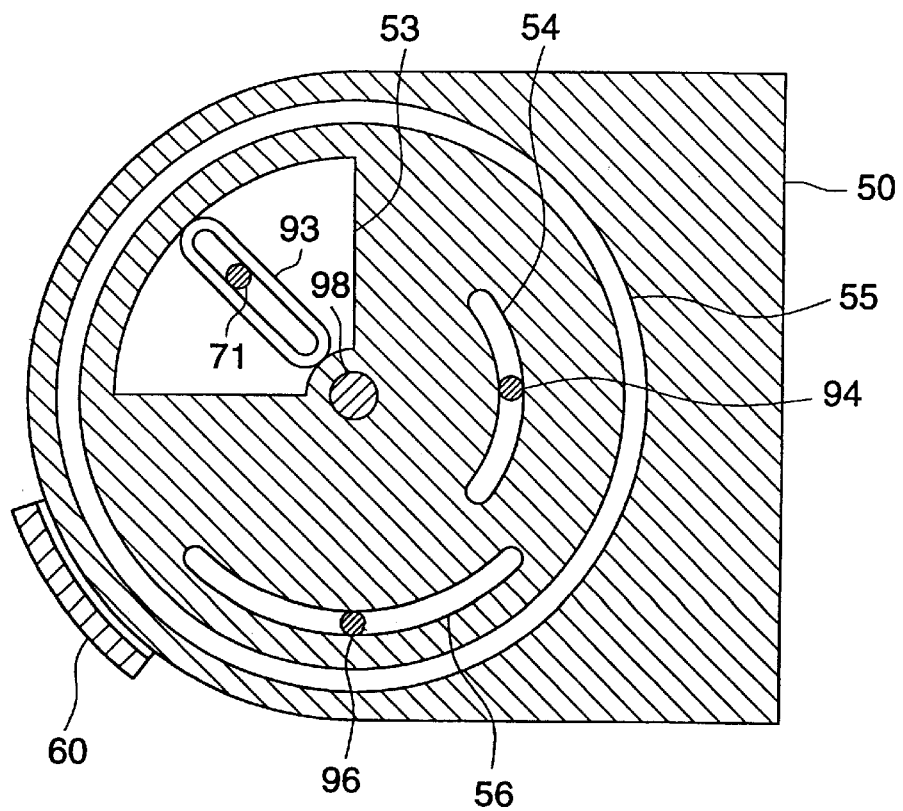
FIG. 17 is a sectional view taken on line C-C' in FIG. 16.

First, the structure of electronic camera EC in the present embodiment will be explained as follows, referring to FIG. 14 which is a perspective view of electronic camera EC viewed from the upper left on the front of image pickup section 83 in the image pickup direction 4, FIG. 15 which is a top view of the electronic camera EC, FIG. 16 which is a central section on the side of electronic camera EC, and FIG. 17 which is a sectional view taken on line C-C' in FIG. 16.

First, an image pickup mechanism of the electronic camera will be explained. Image pickup section 83 has therein a 2-dimensional CCD sensor and is held by image pickup section holding member 84. The image pickup section 83 picks up images of a subject with the 2-dimensional CCD sensor and sends pickup images thus obtained to an unillustrated image processing section. Then, the image processing section conducts prescribed image processing and sends the pickup images thus processed to an equipment such as a notebook computer or the like through cord 5.

Main frame 50 of electronic camera EC, when it holds image pickup section holding member 84, holds indirectly image pickup section 83. Second image focusing section 82 is held by the main frame 50 to be adjacent to and to be ahead of the image pickup section 83 in the image pickup direction 4 on image pickup section holding member 84. First image focusing section 81 is held by the main frame 50 to be ahead of the image pickup section 83 in the image pickup direction 4 on the second image focusing section 82. These first image focusing sections 81 and second image focusing section 82 focus an image of a subject on the image pickup section 83. Light quantity adjusting member 70 is held between the first image focusing sections 81 and the second image focusing section 82 to be capable of moving straight in the direction perpendicular to the page of FIG. 16. Opening 51 for image pickup is provided to be ahead of the image pickup section 83 in the image pickup direction 4.

At the central portion on the top surface of the main frame 50, there is provided dial shaft hole 58 which rotatably holds dial shaft 98 that is to be inserted into the dial shaft hole 58. Due to this, dial member 90 is mounted rotatably on the main frame 50. The dial member 90 is provided with cam groove 93 so that light quantity adjusting member 70 having therein plural light quantity adjusting sections 72A–72C each being different from others in terms of amount of light quantity adjustment may be interlocked with rotation of the dial member 90. Due to this, when pin 71 which is a follower provided on one end of the light quantity adjusting member 70 is inserted in the cam groove 93 to slide in the groove in accordance with rotation of the dial member 90, the light quantity adjusting member 70 held to be capable of moving straight in the direction perpendicular to the image pickup direction of image pickup section 83 moves straight.

In order to improve rotation accuracy of the dial member 90, there are provided arc-shaped slit holes 54 and 56 which regulate movement of auxiliary rotors 94 and 96 of the dial member 90 on the top surface of the main frame 50.

Owing to these mechanisms, the light quantity adjusting member 70 can move straight interlocking with dial 91 to position either one of plural light quantity adjusting sections 72A–72C to be ahead of image pickup section 83 in the image pickup direction. Due to this, an amount of light quantity adjustment can be adjusted only by rotation of dial 91, which makes an electronic camera to be small in size, low in cost and easy to operate.

Next, the relation between an angle of rotation of dial 91 and light quantity adjusting sections 72A–72C will be explained based on FIG. 18 which is an illustration (enlarged top view) showing the relation between an angle of rotation of dial 91 and light quantity adjusting member 70.

On light quantity adjusting section 72A of light quantity adjusting member 70, there is formed a fixed iris hole equivalent to F4, and on light quantity adjusting section 72B of light quantity adjusting member 70, there is formed a fixed iris hole equivalent to F8. Further, on light quantity adjusting section 72C of light quantity adjusting member 70, there is formed a fixed iris hole equivalent to F16.

Distance L0 between the center of light quantity adjusting section 72C of light quantity adjusting member 70 and the center of pin 71 has the following relation with distance between the center of dial 11 and the light quantity adjusting member 70 (distance from light quantity adjusting sections 72A–72C positioned to be ahead of image pickup section 83 in the image pickup direction 4) R0 and with angle formed between the image pickup direction 4 passing through the center of dial 11 and pin 71 (angle formed between cam groove 93 and the image pickup direction 4 passing through the center of dial 11 in the case where light quantity adjusting section 72C of light quantity adjusting member 70 is positioned to be ahead of image pickup section 83 in the image pickup direction 4) θ 0.

$$L0 = R0 \times \tan(\theta 0)$$

Figure 18:
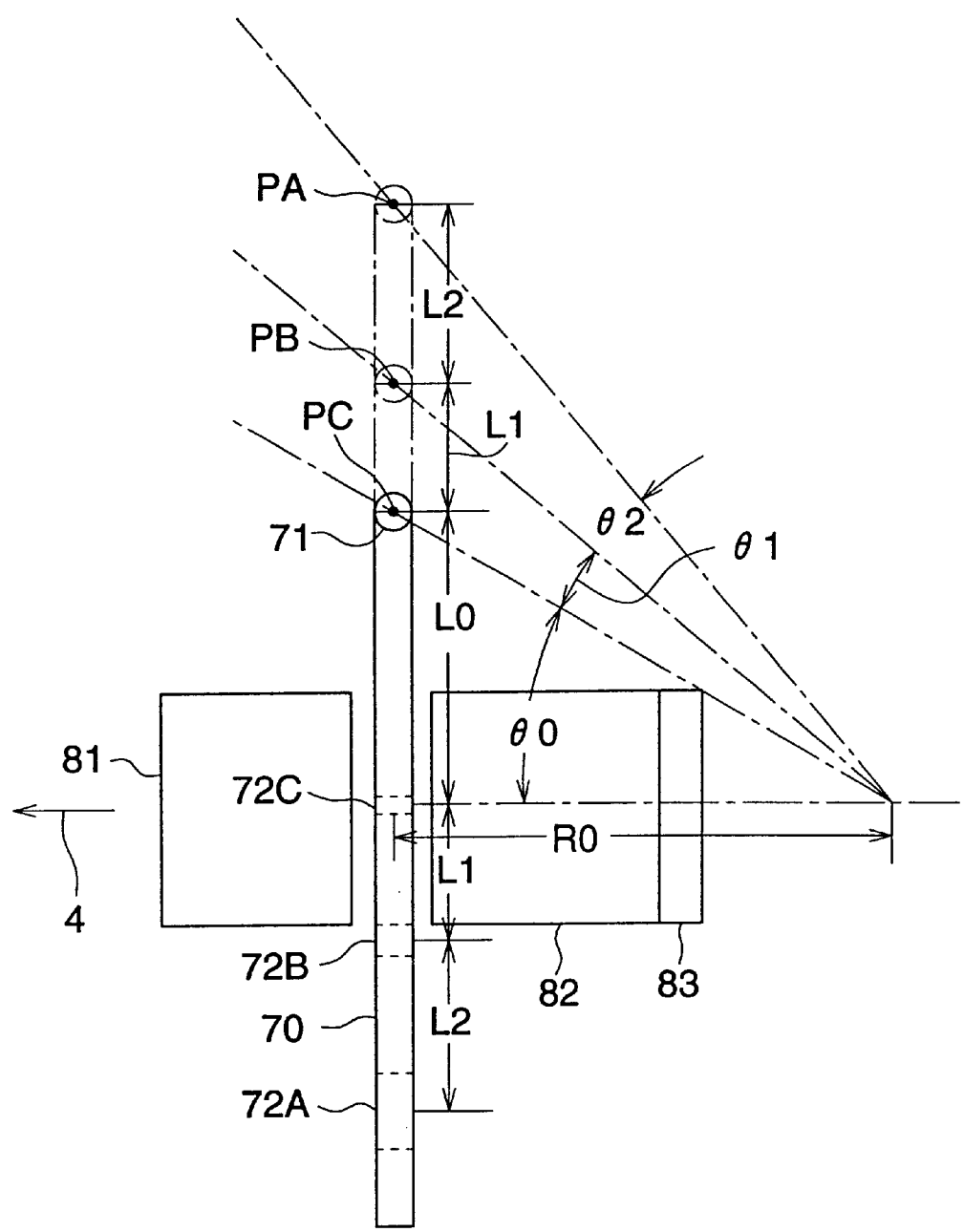
FIG. 18 is an illustration (enlarged top view) showing the relation between a rotation angle of dial 91 and light quantity adjusting member 70 in Embodiment 3.

When dial 11 rotates clockwise to exceed angle θ 1 in FIG. 18, the center of light quantity adjusting section 72B of light quantity adjusting member 70 is positioned to be ahead of image pickup section 83 in the image pickup direction 4. Therefore, distance L1 between the center of light quantity adjusting section 72C of light quantity adjusting member 70 and the center of light quantity adjusting section 72B of light quantity adjusting member 70 is in the relation satisfying the following expression with other numerical values.

$$L1 = R0 \times \tan(\theta 0 + \theta 1) - L0$$
$$= R0 \times (\tan(\theta 0 + \theta 1) - \tan(\theta 0))$$

Further, when dial 11 rotates clockwise to exceed angle θ 2 which is the same as θ 1 in FIG. 18, the center of light quantity adjusting section 72A of light quantity adjusting member 70 is positioned to be ahead of image pickup section 83 in the image pickup direction 4 of image pickup section 83 in the image pickup direction 4. Therefore, distance L2 between the center of light quantity adjusting section 72B of light quantity adjusting member 70 and the center of light quantity adjusting section 72A of light quantity adjusting member 70 is in the relation satisfying the following expression with other numerical values.

$$L2 = R0 \times \tan(\theta 0 + \theta 1 + \theta 2) - (L0 + L1)$$
$$= R0 \times (\tan(\theta 0 + 2 \times \theta 1) - \tan(\theta 0 + \theta 1))$$

As is apparent from the expression mentioned above, distance L1 between the center of light quantity adjusting section 72C of light quantity adjusting member 70 and the center of light quantity adjusting section 72B of light quantity adjusting member 70 is shorter than distance L2 between the center of light quantity adjusting section 72B of light quantity adjusting member 70 and the center of light quantity adjusting section 72A of light quantity adjusting member 70. Therefore, fixed iris having larger diameter is arranged from light quantity adjusting section 72A.

In the aforesaid manner, a plurality of light quantity adjusting sections 72A–72C are arranged so that either of the plural light quantity adjusting sections 72A–72C may be positioned to be ahead of image pickup section 83 in the image pickup direction 4 for each rotation of dial 11 by the same angle θ 1 and θ 2. Due to this, operator 9 of electronic camera EC can position, in natural feeling, either one of plural light quantity adjusting sections 72A–72C to be ahead of image pickup section 83 in the image pickup direction 4.

Due to the structure that second image focusing section 82 positioned to be ahead of image pickup section 83 in the image pickup direction 4 and first image focusing section 81 positioned to be ahead of the second image focusing section 82 in the image pickup direction 4 are provided for focusing an image of a subject on the image pickup section 83, and plural light quantity adjusting sections 72A–72C of light quantity adjusting member 70 are positioned between the first image focusing section 81 and the second image focusing section 82 both for forming an image of a subject on image pickup section 83, the plural light quantity adjusting sections 72A–72C can become those each being different from others in terms of amount of light quantity adjustment only by being provided with a fixed iris alone, resulting in adjustment of an amount of light quantity adjustment which can be conducted in a simpler structure and in an electronic camera which can be made to be smaller in size and lower in cost.

Next, the shape of the main frame 50 viewed from its upper portion mainly is one wherein a semicircle and a rectangle whose longer side is a diameter of the semicircle are combined. There is provided dial shaft hole 58 whose center agrees with the center of the semicircle in terms of position, and the dial shaft hole 58 rotatably holds dial shaft 98 that is to be inserted into the dial shaft hole 58. There is further provided slightly-recessed portion 55 in a shape of a circumference whose center is the center of the semicircle so that circular projected portion 92 of dial member 90 rotates while sliding. On the outer side of the circular recessed portion 55, there are provided at regular angular intervals light quantity adjustment amount indicating sections 57A–57C which indicate light quantity adjustment amount corresponding to light quantity adjusting sections 72A–72C. Namely, they indicate with F numbers of fixed iris such as F4:F8:F16 as shown in FIG. 15. There is provided indicator 97 on the upper surface of dial 91 so that the indicator points to the light quantity adjustment amount indicating sections 57A–57C showing the light quantity adjusting sections 72A–72C positioned to be ahead of image pickup section 83 in the image pickup direction 4.

Arc-shaped hole 52 which is concentric with the semicircle is provided outside the circular recessed portion 55 in the image pickup direction 4, and arc-shaped hole 52 is also provided in the same way at the lower portion of main frame 50. These arc-shaped holes 52 engage with arc-shaped projected portions provided on cover 60 so that the cover 60 can slide to cover the front portion of the opening 51, namely, to freely open or close the front portion of the image pickup section 83 in the image pickup direction 4.

As a variation of the present embodiment, is also acceptable that a motor to rotate dial 11 is provided, for example, so that the dial 11 may be rotated by the motor based on control signals coming from notebook computer 8, without being rotated manually. Even in this case, it is possible to position either of the cover 12 and plural light quantity adjusting sections 17A–17C to be ahead of the image pickup section 43 in the image pickup direction 4 only by rotating the dial 11 by a certain angle. It is therefore possible to simply carry out the control to position either of the cover 12 and plural light quantity adjusting sections 17A–17C to be ahead of the image pickup section 43 in the image pickup direction 4.

Embodiment 4

Figure 19:
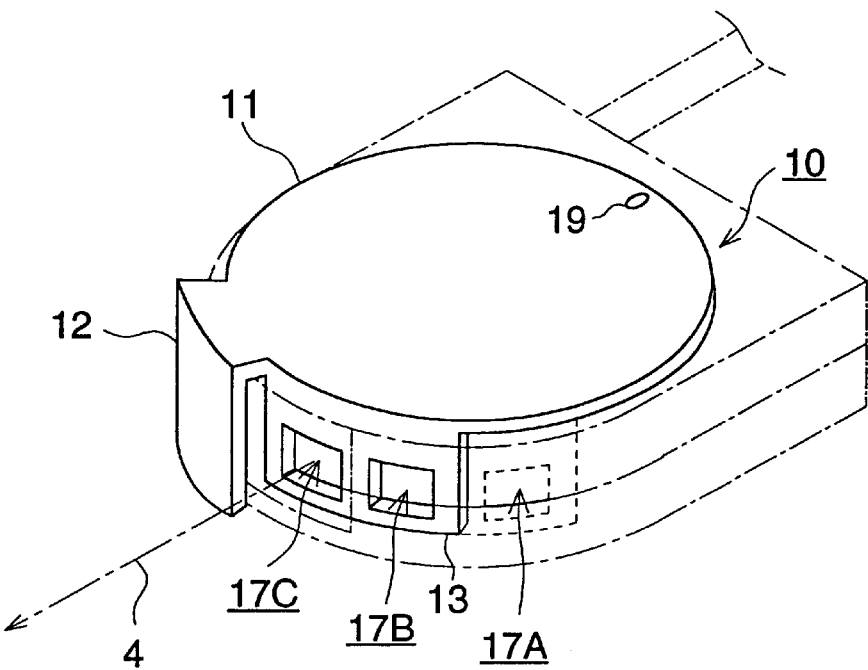
FIG. 19 is a perspective view of dial member 10 in Embodiment 4 viewed from the upper left on the front of image pickup direction 4 of image pickup section 43.

The present embodiment is one for an electronic camera of the invention, which is a variation of Embodiment 1. Points different from Embodiment 1 will be explained as follows, referring to FIG. 19 which is a perspective view of dial member 10 viewed from the upper left on the front of image pickup section 43 in the image pickup direction 4. Incidentally, an outline of the whole of the electronic camera is shown with one-dot chain lines, and those of Embodiment 2 are shown with broken lines.

An example wherein an open-F number of image-focusing section 41 is F4 will be explained. Dial member 10 in the present embodiment does not have light quantity adjusting section 17A of Embodiment 1 but has a blank portion which is not observed at the location corresponding to the light quantity adjusting section 17A of Embodiment 1. A filter with transmission factor of 25% is provided on light quantity adjusting sections 17B to obtain an amount of light quantity adjustment equivalent to F8, and a filter with transmission factor of 6.25% is provided on light quantity adjusting sections 17B to obtain an amount of light quantity adjustment equivalent to F16. Due to this, a quantity of light entering the image pickup section 43 can be on three steps, while reducing cost by providing no light quantity adjusting section 17A.

An indication of light quantity adjustment amount indicating sections 57A–57C and pointing conducted by indicator 19 provided on the upper surface of dial 11 are the same as those in Embodiment 1, and recessed portions 24A–24D which engage with projected portion 14 formed on the side of light quantity adjusting member 13 are the same as those in Embodiment 1, which makes it possible to provide effects which are similar to those in Embodiment 1.

Embodiment 5

Figure 20:
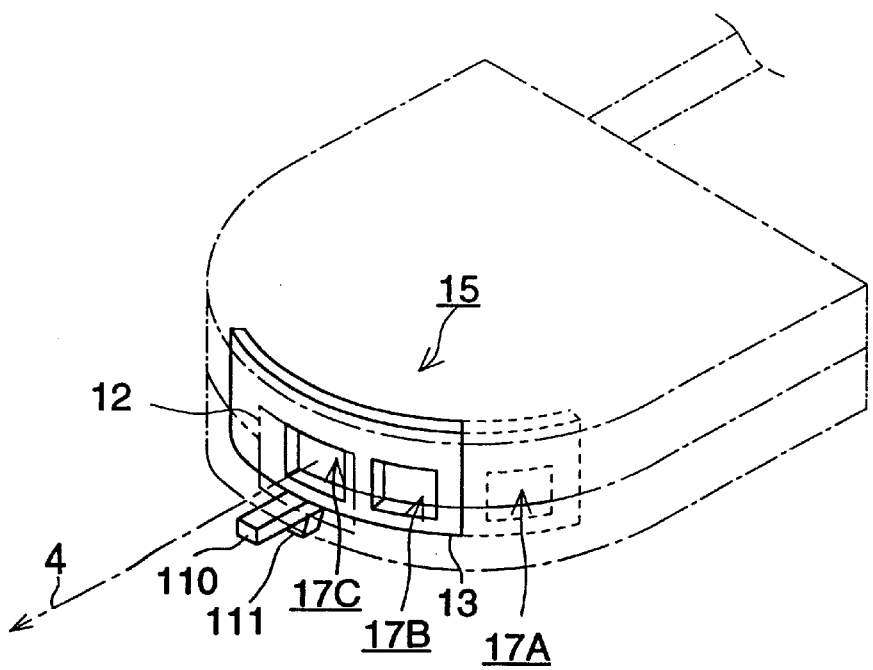
FIG. 20 is a perspective view of reciprocating member 15 in Embodiment 5 viewed from the upper left on the front of image pickup direction 4 of image pickup section 43.

The present embodiment is one for an electronic camera of the invention, which is a variation of Embodiment 2. Points different from Embodiment 2 will be explained as follows, referring to FIG. 20 which is a perspective view of reciprocating member 15 viewed from the upper left on the front of image pickup section 43 in the image pickup direction 4. Incidentally, an outline of the whole of the electronic camera is shown with one-dot chain lines, and those of Embodiment 2 are shown with broken lines.

An example wherein an open-F number of image-focusing section 41 is F4 will be explained. Reciprocating member 15 in the present embodiment does not have light quantity adjusting section 17A of Embodiment 1 but has a blank portion which is not observed at the location corresponding to the light quantity adjusting section 17A of Embodiment 1. A filter with transmission factor of 25% is provided on light quantity adjusting sections 17B to obtain an amount of light quantity adjustment equivalent to F8, and a filter with transmission factor of 6.25% is provided on light quantity adjusting sections 17B to obtain an amount of light quantity adjustment equivalent to F16. Due to this, a quantity of light entering the image pickup section 43 can be on three steps, while reducing cost by providing no light quantity adjusting section 17A.

Recessed portions 34A–34D which engage with projected portion 111 formed on the bottom portion of lever 110 formed on a part of the bottom surface of the reciprocating member 15 can be the same as those in Embodiment 2, and thereby the effects identical to those in Embodiment 2 can be produced.

Embodiment 6

The present embodiment is one for an electronic camera of the invention, which is a variation of Embodiment 3. Points different from Embodiment 3 will be explained as follows, referring to FIG. 21 which is an illustration (enlarged top view) showing the relation between an rotation angle of dial 91 and light quantity adjusting member 70. Broken lines show those in Embodiment 3.

An example wherein an open-F number of the combination of first image-focusing section 81 and second image-focusing section 82 is F4 will be explained. Light quantity adjusting member 70 in the present embodiment does not have a portion corresponding to light quantity adjusting section 72A in Embodiment 3. Further, on light quantity adjusting section 72B of light quantity adjusting member 70, there is formed a fixed iris hole corresponding to F8. Further, on light quantity adjusting section 72C of light quantity adjusting member 70, there is formed a fixed iris hole corresponding to F16.

Distance L0 between the center of light quantity adjusting section 72C of light quantity adjusting member 70 and the center of pin 71 has the following relation with distance between the center of dial 11 and the light quantity adjusting member 70 (distance from light quantity adjusting sections 72A–72C positioned to be ahead of image pickup section 83 in the image pickup direction 4) R0 and with angle formed between the image pickup direction 4 passing through the center of dial 11 and pin 71 (angle formed between cam groove 93 and the image pickup direction 4 passing through the center of dial 11 in the case where light quantity adjusting section 72C of light quantity adjusting member 70 is positioned to be ahead of image pickup section 83 in the image pickup direction 4) θ 0.

$$L0 = R0 \times \tan(\theta 0)$$

Figure 21:
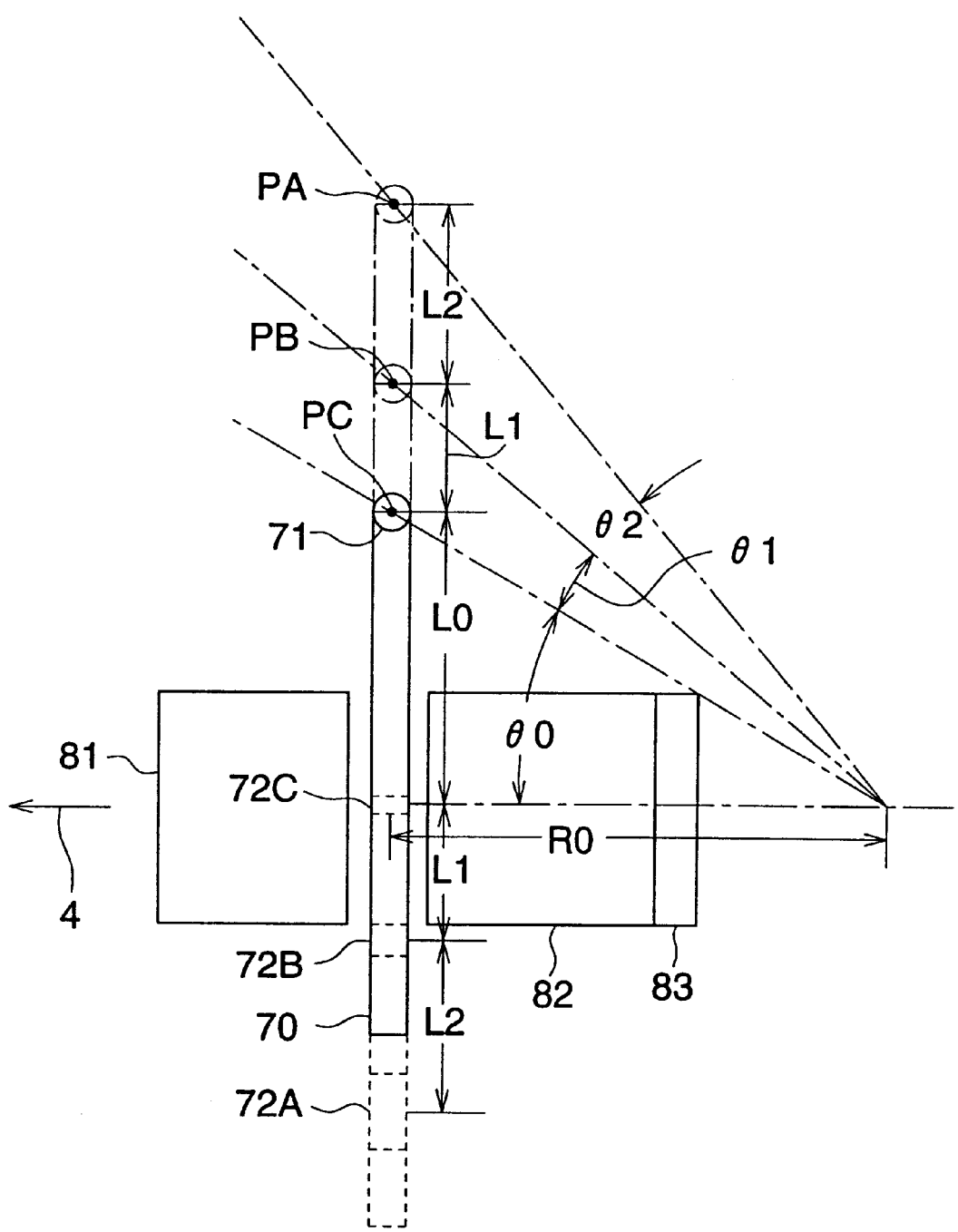
FIG. 21 is an illustration (enlarged top view) showing the relation between a rotation angle of dial 91 and light quantity adjusting member 70 in Embodiment 6.

When dial 11 rotates clockwise to exceed angle θ 1 in FIG. 21, the center of light quantity adjusting section 72B of light quantity adjusting member 70 is positioned to be ahead of image pickup section 83 in the image pickup direction 4. Therefore, distance L1 between the center of light quantity adjusting section 72C of light quantity adjusting member 70 and the center of light quantity adjusting section 72B of light quantity adjusting member 70 is in the relation satisfying the following expression with other numerical values.

$$L1 = R0 \times \tan(\theta 0 + \theta 1) - L0$$
$$= R0 \times (\tan(\theta 0 + \theta 1) - \tan(\theta 0))$$

Further, when dial 11 rotates clockwise to exceed angle θ 2 which is the same as θ 1 in FIG. 21, a blank portion is positioned to be ahead of image pickup section 83 in the image pickup direction 4. Therefore, distance L2 between the center of light quantity adjusting section 72B of light quantity adjusting member 70 and the blank portion is in the relation satisfying the following expression with other numerical values.

$$L2 = RO \times \tan(\theta O + \theta 1 + \theta 2) - (LO + L1)$$
$$= RO \times (\tan(\theta O + 2 \times \theta 1) - \tan(\theta O + \theta 1)$$

In the manner mentioned above, plural light quantity adjusting sections 72B and 72C as well as a blank portion are arranged so that either of the plural light quantity adjusting sections 72B and 72C as well as the blank portion may be positioned to be ahead of image pickup section 83 in the image pickup direction 4 for each rotation of dial 11 by the same angle θ 1 and θ 2. Due to this, operator 9 of electronic camera EC can position, in natural feeling, either one of the plural light quantity adjusting sections 72B and 72C and the blank portion to be ahead of image pickup section 83 in the image pickup direction 4.

Since second image-focusing section 82 positioned to be ahead of image pickup section 83 in the image pickup direction 4 and first image-focusing section 81 positioned to be ahead of image pickup section 83 in the image pickup direction 4 are provided for focusing an image of a subject on the image pickup section 83, and plural light quantity adjusting sections 72B and 72C of image quantity adjusting member 70 or a blank portion is positioned between the first image-focusing section 81 and the second image-focusing section 82 both for focusing an image of a subject on the image pickup section 83, the structure to adjust an amount of light quantity adjustment can be made simpler and an electronic camera can be made smaller in size and lower in cost.

Due to the foregoing, indication of light quantity adjustment amount indicating sections 57A–57C and pointing conducted by indicator 97 provided on the top surface of dial 91 are the same as those in Embodiment 3.

Effect of the Invention

The invention makes it possible to adjust an amount of light quantity adjustment simply and to make an electronic camera small in size and low in cost.

What is claimed is:

1. An electronic camera, comprising:
    a photographing section for photographing a subject;
    a casing in which the photographing section is accommodated;
    a plurality of light amount regulating members for regulating a light amount incident to the photographing section, wherein the light amount regulated by each light amount regulating member is different from others;
    a cover for covering the photographing section;
    a rotating member mounted rotably to the casing; wherein the plurality of light amount regulating members and the cover are attached to the rotating member so that each of the plurality of light amount regulating members and the cover is located at the front of the photographing section in a photographing direction by rotating the rotating member.

2. The electronic camera of claim 1, wherein the axis of rotation of the rotating member is perpendicular to the optical axis of the photographing section.

3. The electronic camera of claim 1, wherein the rotating member is a disk-shaped dial whose center is used as the axis of rotation.

4. The electronic camera of claim 3, wherein the light amount regulating member and the cover are arranged in a single line along the circumference of the dial and are made in a single unit with the dial.

5. The electronic camera of claim 1, further comprising:
    an image focusing section, provided at the front of the photographing section in the photographing direction, for focusing an image onto the photographing section, wherein each of the plurality of light amount regulating members and the cover member is located at the front of the image focusing section in the photographing direction by rotating the rotating member, and wherein each of some light amount regulating members are provided with a different filter so as to regulate a different light amount incident to the photographing section when located at the front of the photographing section.

6. The electronic camera of claim 1, wherein the plurality of light amount regulating members are arranged in such a manner that one of the plurality of light amount regulating members is located at the front of the photographing section in the photographing direction for each rotation of the rotating member by the same angle.

7. The electronic camera of claim 1, further comprising a second image focusing section provided at the front of the photographing section in the photographing direction, and a first image focusing section provided at the front of the second image focusing section in the photographing direction, wherein each of some light amount regulating members is provided with a fixed different iris diaphragm so as to regulate a different light amount from others, and wherein the plurality of light amount regulating members are provided between the first image focusing member and the second image focusing member.

8. The electronic camera of claim 7, wherein the rotating member is a disk-shaped dial whose center is used as the axis of rotation.

* * * * *